United States Patent [19]

Shaw et al.

[11] Patent Number: 5,032,461
[45] Date of Patent: Jul. 16, 1991

[54] METHOD OF MAKING A MULTI-LAYERED ARTICLE

[75] Inventors: David G. Shaw; Angelo Yializis, both of Tucson, Ariz.; Donald S. Strycker, Glen Falls; Mooyoung Ham, Scotia, both of N.Y.

[73] Assignee: Spectrum Control, Inc., Erie, Pa.

[21] Appl. No.: 597,112

[22] Filed: Oct. 12, 1990

Related U.S. Application Data

[63] Continuation of Ser. No. 187,960, Apr. 29, 1988, abandoned, which is a continuation-in-part of Ser. No. 946,146, Dec. 22, 1986, which is a continuation of Ser. No. 620,647, Jun. 14, 1984, abandoned, which is a continuation-in-part of Ser. No. 562,779, Dec. 19, 1983, abandoned.

[51] Int. Cl.$^5$ ............................................. B32B 27/06
[52] U.S. Cl. .................................. 428/461; 118/50.1; 118/718; 118/719; 118/730; 427/44; 427/81; 427/251; 427/255.6; 428/515
[58] Field of Search ........................ 118/50.1, 718, 719, 118/720, 730; 427/35, 36, 44, 79, 80, 81, 251, 299, 327, 255.6; 264/81; 29/25.42; 361/313; 428/461, 462, 515, 519, 521, 463

[56] References Cited

U.S. PATENT DOCUMENTS

| | | | |
|---|---|---|---|
| 1,873,548 | 8/1932 | Cole | 361/310 |
| 2,389,420 | 11/1945 | Deyrup | 29/25.42 X |
| 2,590,906 | 4/1952 | Tripp | 350/166 |
| 2,614,524 | 10/1952 | Haynes | 118/720 |
| 2,734,478 | 2/1956 | Reynolds et al. | 118/665 |
| 2,820,934 | 1/1958 | Mullikin | 361/308 |
| 2,971,862 | 2/1961 | Baer et al. | 118/718 |
| 3,024,394 | 3/1962 | Salisbury | 361/308 |
| 3,068,510 | 12/1962 | Coleman | 204/168 |
| 3,081,201 | 3/1963 | Koller | 427/81 |
| 3,123,490 | 3/1964 | Bolomey et al. | 106/415 |
| 3,237,273 | 3/1966 | Gunter et al. | 29/25.42 |
| 3,244,953 | 4/1966 | Walsh et al. | 361/323 |

(List continued on next page.)

FOREIGN PATENT DOCUMENTS

| | | | |
|---|---|---|---|
| 789746 | 7/1958 | Canada . | |
| 2641232 | 9/1976 | Fed. Rep. of Germany | 29/25.42 |
| 2737509 | 3/1979 | Fed. Rep. of Germany | 29/25.42 |
| 2759118 | 7/1979 | Fed. Rep. of Germany | 29/25.42 |
| 3231576 | 3/1984 | Fed. Rep. of Germany . | |
| 55-27455 | 7/1980 | Japan | 29/25.42 |
| 58-74701 | 5/1983 | Japan . | |
| 59-177365 | 10/1984 | Japan . | |
| 313676 | 6/1956 | Switzerland | 361/273 |
| 550419 | 1/1943 | United Kingdom . | |
| 762953 | 12/1956 | United Kingdom . | |
| 970865 | 9/1964 | United Kingdom . | |

(List continued on next page.)

OTHER PUBLICATIONS

Morrison, R. T. and R. N. Boyd, "Organic Chemistry", 4th Ed. (Allyn and Bacon, Inc.; Boston), pp. 436–439.
"Thin-Film Multilayer Capacitors Using Pyrolytically Deposited Silicon Dioxide", Richard A. Bailey, and Joseph H. Nevin, IEEE Transactions on Parts, Hybirds and Packaging, vol. PHP-12, No. 4, Dec. 1976.

(List continued on next page.)

Primary Examiner—Norman Morgenstern
Assistant Examiner—Terry J. Owens
Attorney, Agent, or Firm—Marshall, O'Toole, Gerstein, Murray & Bicknell

[57] ABSTRACT

A high speed process for forming a multi layered thin film structure in a vacuum wherein each film is less than about four microns thick and the total layers can reach upwards to 4,000 or more. The polymeric layers are formed of a cross linked component selected from the group consisting of polyfunctional acrylates and mixtures of polyfunctional acrylates and monocrylates with the component having a preferable molecular weight of between 200 and 300 and a vapor pressure preferably in excess of $1 \times 10^{-2}$ Torr. The polymeric layers may be interleaved with metal layers.

36 Claims, 14 Drawing Sheets

U.S. PATENT DOCUMENTS

| | | | |
|---|---|---|---|
| 3,252,830 | 5/1966 | Cummin et al. | 361/323 X |
| 3,326,718 | 6/1967 | Dill | 427/81 |
| 3,457,614 | 7/1969 | Tibol | 29/25.42 |
| 3,466,719 | 9/1969 | Sharif et al. | 29/25.42 |
| 3,520,987 | 7/1970 | Ohlrich | 361/328 X |
| 3,547,683 | 12/1970 | Williams et al. | 427/36 |
| 3,617,834 | 11/1971 | Rayburn | 29/25.42 X |
| 3,654,532 | 4/1972 | Rayburn | 361/304 |
| 3,743,532 | 7/1973 | Wright et al. | 428/336 |
| 3,819,990 | 6/1974 | Hayashi et al. | 29/25.42 X |
| 4,076,866 | 2/1978 | Platakis et al. | 427/250 |
| 4,121,537 | 10/1978 | Maruyama et al. | 118/664 |
| 4,153,925 | 5/1979 | Gazard et al. | 361/323 |
| 4,207,836 | 6/1980 | Nonaka | 118/664 |
| 4,261,798 | 4/1981 | Palmer | 203/9 |
| 4,277,516 | 7/1981 | Behn et al. | 427/81 |
| 4,290,384 | 9/1981 | Ausschnitt et al. | 118/722 |
| 4,294,194 | 10/1981 | Behn et al. | 118/730 |
| 4,301,580 | 11/1981 | Wallace | 29/25.42 X |
| 4,301,765 | 11/1981 | Behn et al. | 118/718 |
| 4,329,419 | 5/1982 | Goff et al. | 430/283 |
| 4,363,162 | 12/1982 | Price | 29/25.42 |
| 4,376,329 | 3/1983 | Behn et al. | 29/25.42 |
| 4,378,382 | 3/1983 | Behn | 427/9 |
| 4,379,182 | 4/1983 | Behn et al. | 427/41 |
| 4,387,113 | 6/1983 | Behn | 427/40 |
| 4,403,381 | 9/1983 | Almahmoud et al. | 29/25.42 |
| 4,414,722 | 11/1983 | Wehnelt | 29/25.42 |
| 4,434,452 | 2/1984 | Hamabe et al. | 361/273 X |
| 4,453,199 | 6/1984 | Ritchie et al. | 29/25.42 X |
| 4,490,774 | 12/1984 | Olson et al. | 361/311 |
| 4,502,095 | 2/1985 | Pachonik | 361/273 |
| 4,508,049 | 4/1985 | Behn et al. | 29/25.42 |
| 4,533,710 | 8/1985 | Olson et al. | 526/323.2 |
| 4,543,275 | 9/1985 | Akashi et al. | 427/250 |
| 4,571,316 | 2/1986 | Naruse et al. | 427/44 |

FOREIGN PATENT DOCUMENTS

| | | | |
|---|---|---|---|
| 1104172 | 2/1968 | United Kingdom | |
| 1168641 | 10/1969 | United Kingdom | |
| 1253124 | 11/1971 | United Kingdom | |
| 2033355 | 5/1980 | United Kingdom | 264/81 |
| 2085755 | 5/1982 | United Kingdom | 427/44 |
| 82/00542 | 2/1982 | World Int. Prop. O. | |

OTHER PUBLICATIONS

"Thin-Film Multilayer Capacitors Using Pyrolytically Deposited Silicon Dioxide", Richard A. Bailey and Joseph H. Nevin, pp. 361-364 (1976).

"Formation of Thin Polymer Films by Electron Bombardment", Robert W. Christy, pp. 1680-1683 (1960).

"Preparation and Properties of Dielectric Layers Formed by Surface Irradiation Techniques", Peter White, pp. 52-58 (1967).

"Polymerization of Butadiene Gas on Surfaces Under Low Energy Electron Bombardment", I. Haller and P. White, pp. 1784-1788 (1963).

METHOD OF MAKING A MULTI-LAYERED ARTICLE

This application is a continuation of application Ser. No. 07/187,960, filed Apr. 29, 1988, now abandoned, which is a continuation-in-part of application Ser. No. 06/946,146 filed Dec. 22, 1986 which is a continuation of application Ser. No. 06/620, 647 filed June 14, 1984, now abandoned, which is a continuation-in-part of application Ser. No. 562,779 filed Dec. 19, 1983, now abandoned.

FIELD OF INVENTION

This invention relates generally to thin solid films and more particularly to thin, multi layered, film structures including multi layered capacitors together with the methods and apparatus for making them.

CROSS REFERENCE

This invention is related to the following copending, commonly assigned patents: U.S. Pat. No. 4,499,520, issued Feb. 12, 1985 entitled "Capacitor With Dielectric Comprising Poly-Functional Acrylate Polymer And Method of Making"; U.S. Pat. No. 4,490,774, issued Dec. 25, 1984, entitled "Capacitors Containing Poly-Functional Acrylate Polymers As Dielectrics"; U.S. Pat. No. 4,533,710, issued Aug. 6, 1985 entitled "1, 2-Alkanediol Diacrylate Monomers And Polymers Thereof Useful As Capacitor Dielectrics"; U.S. Pat. No. 4,513,349, issued Apr. 23, 1985 entitled "Acrylate-Containing Mixed Ester Monomers And Polymers Thereof Useful As Capacitors Dielectrics"; and U.S. Pat. No. 4,515,931, issued May 7, 1985, entitled "Poly-Functional Acrylate Monomers And Polymers Thereof Useful As Capacitor Dielectrics", all of which are hereby incorporated by reference. This application is also related to Ser. No. 188,036, filed simultaneously herewith having the same inventors and entitled "Single Layer Structure And Process For Making Same", all of which is incorporated by reference herein.

BACKGROUND AND OBJECTS OF THE INVENTION

The increasing need for miniaturization of electronic systems has stimulated the development of thin films for microelectronics and, in particular, thin film dielectrics that have a variety of applications varying from protective coatings to energy storage devices in the form of capacitors. Organic/polymer materials utilized in films have shown very attractive dielectric, optical and mechanical properties because they have relatively high strength and undergo elastic deformation when forces are applied so as to minimize stresses in the film structure.

When thin film dielectrics are utilized as a charge storage device such as in a capacitor structure, the specific capacitor structure in conjunction with the properties of the material used to form the capacitor structure serve to define the characteristics and usefulness of the capacitor. This is particularly important in the market environment that presently exists in which miniaturization of the capacitor is desired whereby high capacitance value per unit volume is an important parameter when developing new dielectric systems. Similarly, when films are to be utilized as a protective coating or a dielectric, it is paramount that the film be delamination free, pin hole free and void free.

Further, it is important not only to have a thin, multi layer, solid film with the desired physical, chemical and, depending upon the application, electrical or optical properties, but also, it is imperative that the multi layer film, which in certain applications comprises 5,000 layers, be produced at a rate that is commercially attractive. For example, in British Patent No. 1,168,641 a process is disclosed for producing coatings on metal substrates. The system disclosed, however, is not particularly satisfactory for commercial purposes in many applications because the rate at which the film is manufactured is too slow and/or it appears that it will produce a structure that is not satisfactory.

It is an object of the present invention to provide a thin film, multi layer polymer article which can be produced relatively economically and at a relatively high speed of production. The multi layer structure is monolithic in nature in that multiple dielectric or dielectric and interleaved metal or other inorganic material layers can be formed in a single structure that is cohesive and free of air layers.

It is further an object of the present invention to provide a multi layered structure that has mechanical and electrical properties which are useful in a variety of applications that make use of multiple dielectric layers and/or dielectric and metal layers interleaved in various combinations such as to allow an electrical charge to be stored, electromagnetic radiation to be reflected or other properties of the multi layered structure to be utilized for a particular application.

One particular application of a multi layer film relates to capacitors. A monolithic capacitor is one in which the layers of electrodes and dielectric are bonded together in a unitary structure as opposed, for example, to a metallized film capacitor in which self-supporting films are rolled or wound into the capacitor form. A miniaturized capacitor is one of very small dimensions so as to be suitable for microcircuitry. Small overall size could denote low capacitance of little practical value, except that the thickness of the intervening dielectric layer inversely affects the capacitance between adjacent electrodes, and the number of electrode pairs directly affects capacitance. Therefore, as a matter of basic capacitance theory, a capacitor having very thin dielectric layers and many pairs of electrodes could have substantial capacitance despite being of miniature size with the active area of the electrodes being quite small.

Modern microcircuitry not only is well suited for miniature capacitors, but a further requirement of such capacitor applications is an ability to withstand high temperatures. In an electronic circuit, a capacitor could be subject to sustained temperatures of up to 125°–150° C. Even more demanding, circuit production techniques such as wave soldering could subject capacitors to temperatures beyond the melting point of solder, about 260°–290° C. for as long as 5 to 10 seconds.

It is an object of the invention to provide an improved capacitor concept, including the capacitor architecture itself, as well as the methods and apparatus for forming that architecture that produces a very small, miniature capacitor which nevertheless has practical levels of capacitance.

A further object is to provide a concept of the foregoing kind that can very economically produce multi layer structures such as capacitors, both in the sense of using limited amounts of materials as well as permitting high volume, high speed manufacturing as, for example, in the high speed manufacturing of capacitors. A related object in the instance of capacitors is to provide such a concept in which the electrical connections or leads can be easily and economically added to the individual capacitors, and the capacitor encapsulated without difficulty.

Another object is to provide a concept as characterized above that results in a capacitor capable of withstanding substantial temperatures such as the 260°-290° C. temperature encountered during the process of wave soldering. A collateral object is to provide a concept of this kind that could readily be mounted on the bottom or foil side of a circuit board so as to permit compaction of the required physical size of a circuit using such capacitors.

It is also an object to provide a concept of the above character that is not polarity sensitive, i.e., the capacitor is reversible. An accompanying object is to provide such a concept in which the capacitor fails open, in other words, the capacitor is self-healing rather than being subject to shorting out an entire electrical circuit.

SUMMARY OF THE INVENTION

The invention disclosed and claimed herein serves to achieve the above-identified objectives and to obviate problems associated with prior art multi layer film structures and the processes for making same. Briefly, the invention disclosed and claimed herein relates to a high speed process for forming a multi layered structure wherein each layer is less than about four (4) microns thick and the total number of layers can exceed 1,000, if desired, and upwards of 4,000 or more layers. Each layer is formed of a substantially cross linked component selected from the group consisting of polyacrylates and mixtures of polyacrylates and monoacrylates with the component having an average molecular weight of between 150 and 1,000 and a vapor pressure in the range of $1 \times 10^{-6}$ to $1 \times 10^{-1}$ Torr at standard temperature and pressure. Preferably, the material is a diacrylate. The article produced by the process is substantially delamination free, void free and pin hole free.

The process for manufacturing the multi layered article or structure of the present invention is carried out in a vacuum chamber containing a movable support such as a rotating drum, the surface of which is maintained at a temperature sufficient to permit condensation of a material deposited thereon and generally a temperature in the range of about 7°-about 80° C. (20° to 175° F.) depending on the monomer (or monomer mixture) utilized. A vapor outlet of a vaporizer is mounted adjacent to an upstream portion of the support and a curing means is mounted adjacent to a downstream portion of the support. The chamber is evacuated until the pressure is less than about $1 \times 10^{-1}$ Torr and preferably $1 \times 10^{-5}$ Torr.

A curable monomer component selected from the group mentioned above is metered to a heated vaporizer system where the material is atomized, vaporized and condensed on the surface of the movable support which travels at a speed of between 1 and 1,000 cm/second. Preferably, the material is flash vaporized. The condensed film is less than 4 microns thick. Following deposit of the monomer on the movable support, it is cured by suitable means such as electron beam curing. The deposition and curing steps are repeated until the desired number of layers and shape has been achieved. The process of the present invention permits the formation of a multi layered article comprised of a large number of layers which can exceed 4,000 in number, each layer being less than 4 microns thick with the capability to vary an individual layer thickness from about at least 0.1 to 4 microns. The completed structure is pin hole/void free and will not substantially delaminate due to its cohesive strength. The multi layered article can be flexible or rigid like glass.

The polymer layers can have inorganic material layers such as metal interleaved between the polymer layers.

The multi layered structure made pursuant to the process of the invention exhibits relatively low levels of cracks and delaminations which, it is believed, is due to a low intrinsic residual stress in the article. Further, the structure has been found to have a low moisture content of less than about one percent and a high endurance to thermal stress.

Another important property of a multi layered structure produced by the process of the present invention is that it can be removed from its substrate following deposition and curing and the article can be self-supporting or, if desired, attached on some other surface through fixturing or adhesive methods.

Further, the process of the present invention is particularly suitable for coating flexible substrates such as paper, fabrics, thin metal, plastics such as polyesters, polyethers, polyolefins, and the like, or virtually any flexible material. The products of the coating operation can be used, for example, in optical filters such as laser reflectors, electromagnetic (radar) absorptive coatings, coatings for window treatments or coatings for packaging.

DESCRIPTION OF THE DRAWINGS

Other objects and advantages of the invention will become apparent upon reading the following detailed description and upon reference to the drawings, in which.

DETAILED DESCRIPTION

While the invention will be described in connection with preferred embodiments and procedures, it will be understood that we do not intend to limit the invention to those embodiments or procedures. On the contrary, we intend to cover all alternatives, modifications and equivalents as may be included within the spirit and scope of the invention as defined by the appended claims.

Figure 1:
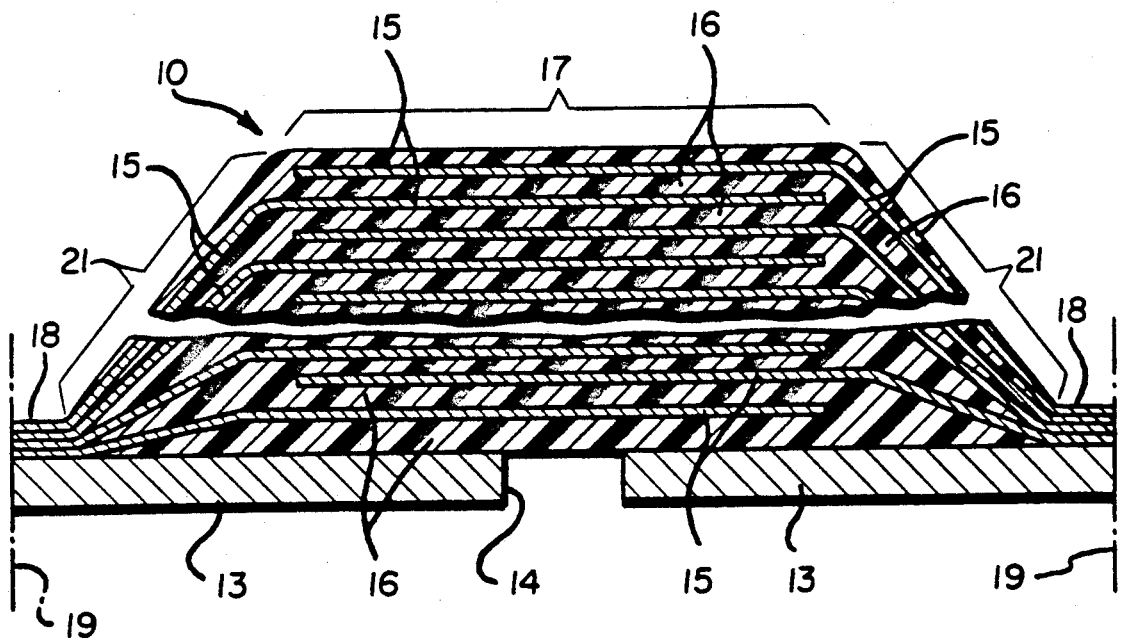
FIG. 1 shows an enlarged cross section of one embodiment showing a capacitor embodying one form of the invention before completion.
Figure 1A:
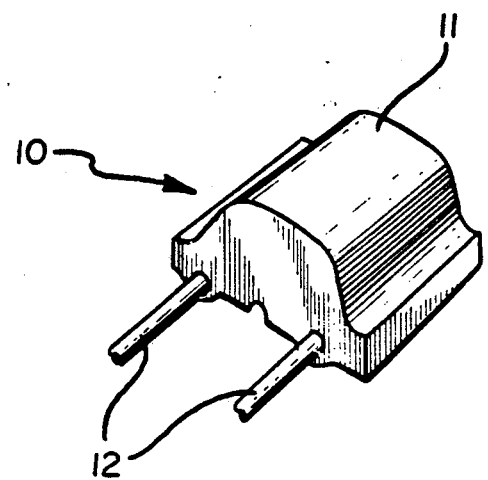
FIG. 1a shows a perspective view of a completed capacitor of the FIG. 1 type.

Turning to the drawings, one multi layer structure of the present invention is shown in FIGS. 1 and 1A in the form of a capacitor 10 which includes an encapsulated body 11 with extending connecting wire leads 12. The FIG. 1 cross section, showing a conductive substrate 13 notched at 14 into separate pieces, conductive layers 15, and dielectric coatings 16, illustrates the capacitor 10 before the leads 12 are connected to the respective pieces of the substrate 13 and the capacitor is encapsulated.

Preferably, the substrate 13 is copper sheet about 1.5-2 mils thick. The conductive layers are electrode material such as aluminum about 200-500 Angstroms thick. The dielectric coatings 16, about 1 micron thick in the center region, and tapering to about 0.3 microns at the edges along the width, are cured, i.e., cross linked, radiation curable resin capable of adhering or bonding to the electrode material and substrate. Useful resins are polyfunctional acrylates, and mixtures thereof, disclosed in patent applications cross referenced above.

The monomer materials utilized are relatively low in molecular weight, between 150 and 1,000, and preferably in the range of 200 to 300, and have vapor pressures between about $1 \times 10^{-6}$ Torr and $1 \times 10^{-1}$ Torr at standard temperature and pressure (i.e., relatively low boiling materials). A vapor pressure of about $1 \times 10^{-2}$ Torr is preferred. Polyfunctional acrylates are especially preferred. The monomers employed have at least two double bonds (i.e., a plurality of olefinic groups). The high-vapor-pressure monomers used in the present invention can be vaporized at low temperatures and thus are not degraded (cracked) by the heating process. The absence of unreactive degradation products means that films formed from these low molecular weight, high-vapor-pressure monomers have reduced volatile levels of component. As a result, substantially all of the deposited monomer is reactive and will cure to form an integral film when exposed to a source of radiation. These properties make it possible to provide substantially continuous coating despite the fact that the film is very thin. The cured films exhibit excellent adhesion and are resistant to chemical attack by organic solvents and inorganic salts.

The monomeric materials employed in the process should provide an average of about two or more olefinic groups per molecule. By way of example, a single diolefinic material, mixtures of two diolefins, or mixtures containing a polyolefin and a monolefin can be employed. These components can be metered into an evaporator individually or as a single mixture.

Due to their low molecular weight and the presence of an average of about two or more olefinic groups, the monomers (or monomer mixtures) utilized are highly reactive. As a result, the monomers can be deposited and cured at rapid speeds, viz, 1 to 1,000 cm/sec.

Because of their reactivity, physical properties, and the properties of cured films formed from such components, polyfunctional acrylates are particularly useful monomeric materials. The general formula for such polyfunctional acrylates is:

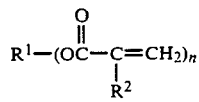

wherein:
R¹ is an aliphatic, alicyclic or mixed aliphatic-alicyclic radical derived from a compound of the formula R¹(OH)$_m$;
R² is a hydrogen, methyl, ethyl, propyl, butyl or pentyl;
n is from 2 to 4;
m is 2 or more.

Such polyfunctional acrylates may also be used in combination with various monoacrylates, such as those having the formula:

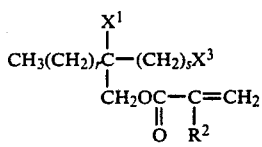

wherein:
R², r and 2 are defined above;
x¹ is H or:

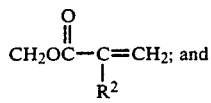

X³ is CN or COOR³ wherein R³ is an alkyl radical containing 1–4 carbon atoms. Most often, X³ is CN or COOCH$_3$.

Diacrylates of the formula below are particularly preferred:

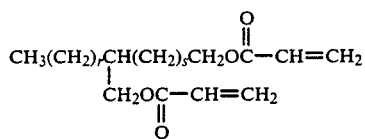

wherein:
r and s are each 7 or 8 and the sum of r and s is 15.
The diacrylates:

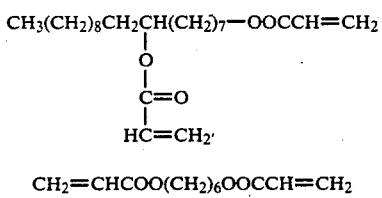

$CH_2=CHCOO(CH_2)_6OOCCH=CH_2$ and alkoxycylated cyclohexane dimethanol diacrylates (wherein the alkoxy group contains 1 to 4 carbon atoms) are especially suitable.

Curing is accomplished by opening the double bonds of the reactant molecules. This can be accomplished by means of an energy source such as apparatus which emits infra red, electron or ultra violet radiation.

Referring to FIG. 1, the dielectric coatings 16 space and separate the conductive layers which are, in effect, divided into two offset sets that extend into a capacitance section or region 17 in which the layers are uniformly interleaved in stacked electrically isolated relation.

It can now be seen that the purpose of the notch 14 is to divide the substrate 13 and thus eliminate electrical connection between the two terminal portions 18.

In carrying out an embodiment of the invention, capacitors like capacitor 10 are simultaneously formed in large numbers by depositing electrode material and dielectric in strips on the substrate 13, which is notched at 14, and which rapidly moves relative to the depositing systems. The layers 15 and coatings 16 are built up in the number desired by causing successive passes to be made relative to the depositing systems. The result (see FIG. 10), is a series of lanes 25 which can be separated along the cut-off lines 19 running in the machine direction 26, a term that will be made evident below, and divided into individual capacitors 10 along cross cut lines 27 spaced in accordance with the nominal capacitance desired. The greater the spacing, the more electrode area each layer will have in the capacitor region 17 of the individual capacitor 10 and the higher will be the resulting capacitance.

From the lane configuration, capacitors 10 are thus cut to desired size, the notch 14 is formed, the leads 12 are added, and the device encapsulated.

The inventive capacitor concept, in one form, includes in one embodiment apparatus arranged within and around a chamber 30 (see FIG. 2) which is either a vacuum chamber or a housing divided into vacuum portions. Within a vacuum environment is a movable support in the form of a carrier 31, a dielectric or monomer deposit system 32, a monomer curing system 33, and an electrode or metal material deposit system 34. A substantial vacuum is required down to the order of $1 \times 10^{-5}$ Torr.

Carrier 31 is a water cooled drum 35 driven by a motor 36 whose outer cylindrical surface 37 defines a rapidly moving continuous surface or support passing through a dielectric or polymer layer forming zone and an electrode or metal forming zone. The regions in which the drum surface 37 and the systems 32, 33 are located constitute the dielectric or polymer layer forming zone, and the region in which the drum surface 37 and the system 34 are located constitute an electrode or metal forming zone. Drum rotation creates the machine direction 26, which is the direction the surface or support passes through the upstream dielectric forming zone and the downstream metal or electrode forming zone.

Because of the small dimensions involved, the surface 37 should be smooth and true. The sheet of substrate 13 is firmly secured to the drum 35 and, when in place, the outer surface of the substrate defines the surface 37. The drum 35 is cooled to a temperature specific to the particular monomer being used and generally in the range of 20° C. to 80° C. to facilitate condensation of the vapor deposits, and the apparatus functions at drum surface speeds of 1 to 1,000 cm/second.

If desired, the sheet of substrate 13 can be eliminated and the dielectric can be condensed directly onto the surface 37 of drum 35. This elimination of a substrate serves to permit a skin tight connection of a dielectric or polymer layer directly onto the drum. Prior to depositing vaporized monomer on the drum surface, a release agent is deposited on the drum. A suitable release agent is available from Micro International Products Corporation, Trenton, N.J. The release agent is a water solution of sodium, ammonium triethanolammonium, ethyleneiaminetetracetate, linearalkylarylsufonates and polyethoxynolphenol.

The electrode or metal material deposit system 34 can be a conventional electron beam vaporization device 41 or a sputtering target or a group of resistive evaporation sources (boats). The rate of vaporization can be sensed by a quartz monitoring device 42 providing feedback for controlling the rate at which aluminum is vaporized by the device 41.

Figure 3:
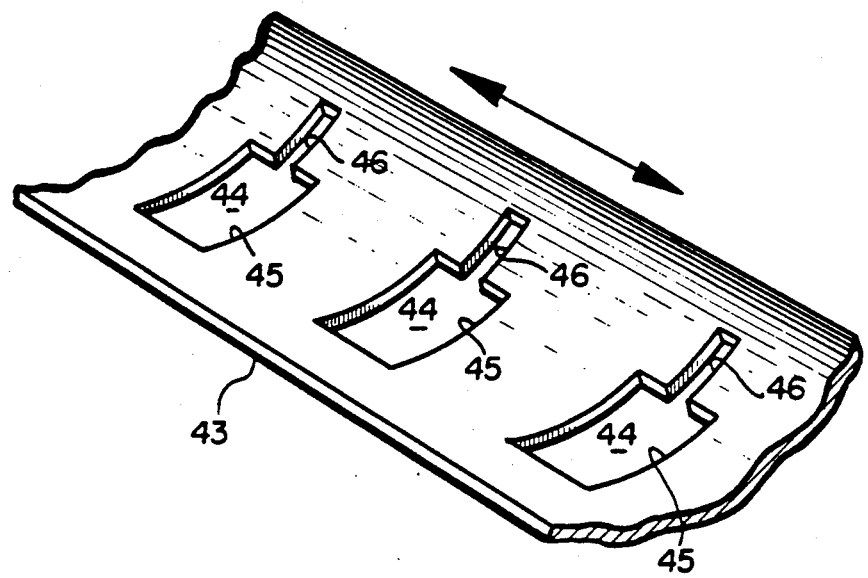
FIG. 3 shows a fragmentary perspective view of a portion of the aluminum metal mask shown in FIG. 2.

The pattern in which aluminum vapor is deposited is controlled by a mask, in this case a shadow mask 43, discussed hereinafter, (FIG. 3) having openings 44 through which the vapor passes.

As it is convenient to energize the device 41 and bring it into stable operating condition before beginning to make a multi layer structure such as a capacitor, a removable shutter 52 is interposed between the device 41 and the mask 43 for closing off the passage of vapor until the shutter 52 is withdrawn.

Figure 5:
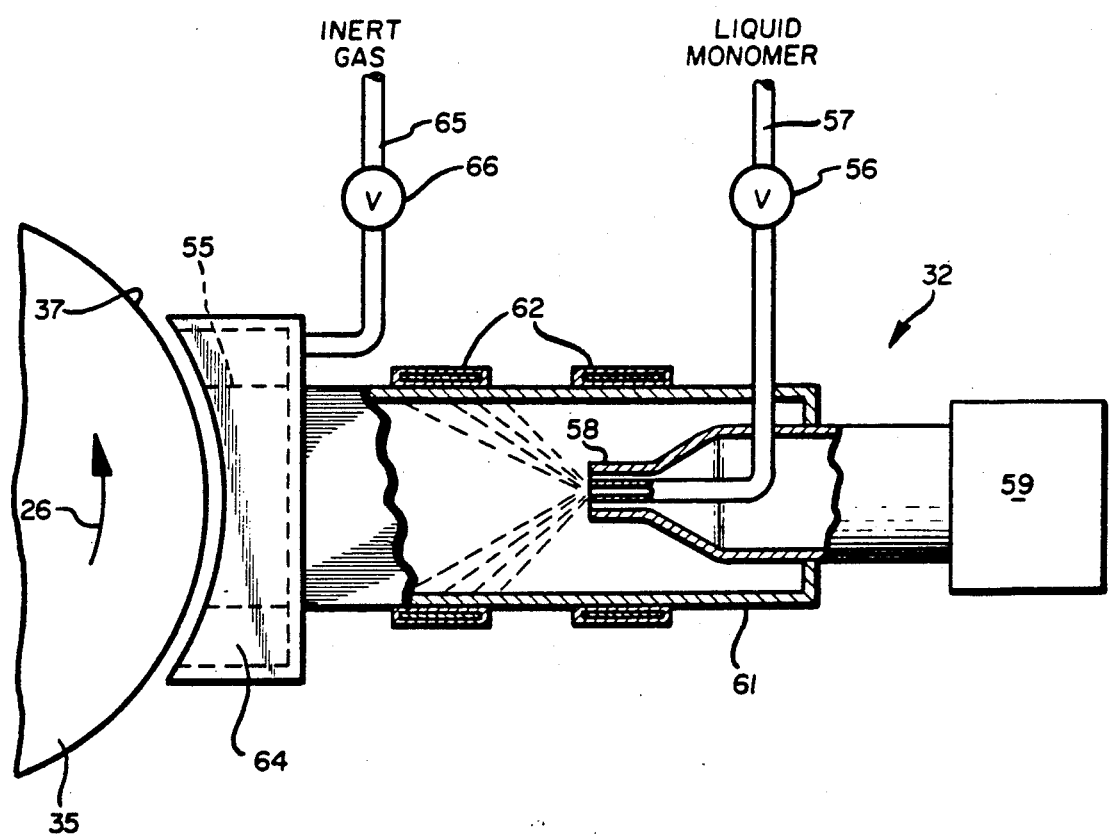
FIG. 5 shows an enlarged, partially sectioned, diagram of a portion of the apparatus shown in FIG. 2 relating to the monomer evaporation system.

As a feature of the invention, the dielectric deposit system 32 (FIG. 5) flash vaporizes the dielectric in monomer form, and the smaller gaseous molecules are guided under moderate differential pressure through nozzles 55 onto the capacitor lanes 25. The monomer in liquid form is fed through a line 57 and control valve 56 to the open end of a horn 58 of an ultrasonic atomizer 59. The resulting micro droplets impinge on the inner walls of a vaporization tube 61 heated by band heaters 62 to an appropriate temperature, approximately 100°–400° C. for the acrylate resins referred to above. The liquid is thus instantaneously vaporized, i.e., flash vaporized, so as to minimize the opportunity for polymerization prior to being deposited on the substrate.

Pressure in the tube 61, at about 1 Torr, causes a monomer gas stream to flow through the nozzles 55 for deposition and condensation. The nozzles 55 are heated by conduction from the tube 61 to minimize condensation before the gas stream leaves the nozzles.

Figure 8:
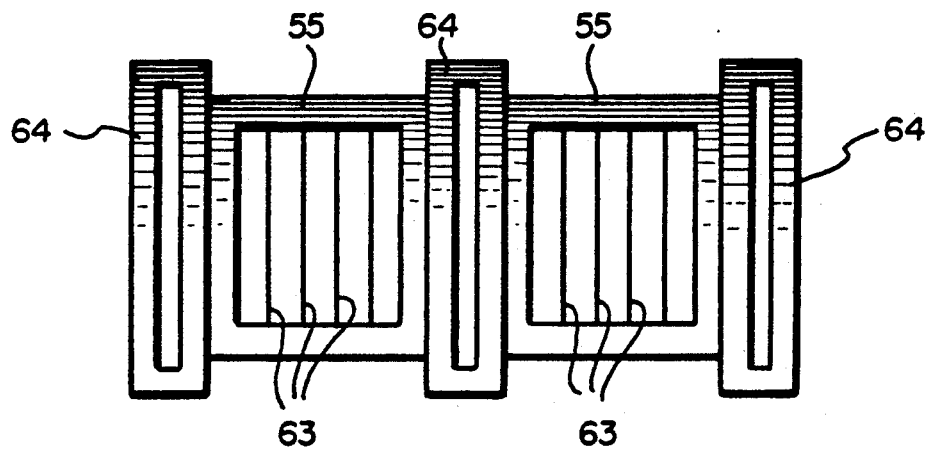
FIG. 8 shows a bottom elevation view of the apparatus shown in FIG. 7.
Figure 9:
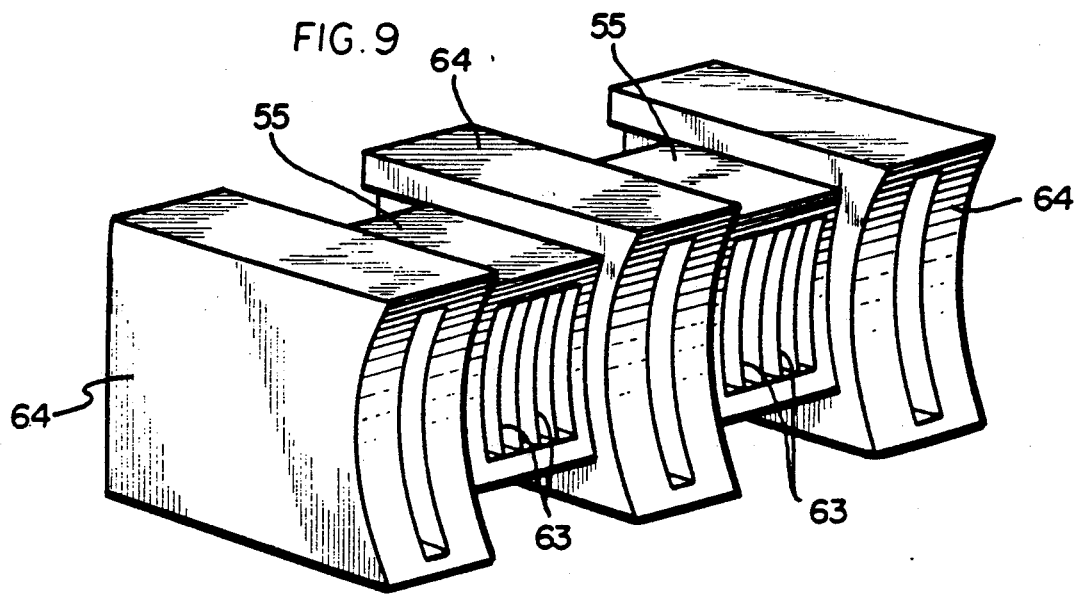
FIG. 9 shows a perspective view of the apparatus shown in FIG. 8.

The deposition is confined, and the tapered edge shape of the coatings 16 obtained, by restricting the monomer gas flow by using guiding deflectors 63 in the nozzles 55 (FIG. 8, 9), placing the nozzles 55 quite close to the condensing surface of the lanes 25, and providing inert gas edge barrier walls delivered through sets of nozzles 64 on either side of the monomer nozzles 55. Inert gas is supplied to the nozzles 64 through a line 65 and a control valve 66, and the nozzles 64 are fixed relative to the surface 37 with about a 4 mil clearance spacing, sufficient to clear the expected build-up of the terminal portions 18. The monomer gas nozzles 55 are stepped back by a retraction motor 67, signaled by the controller 50, upon each revolution of the drum by an amount approximating the thickness of a coating 16.

The thickness of the coating 16 is dependent upon the time of deposit, i.e., the length of the nozzles 55 relative to the speed of the surface 37, and the rate of monomer flow through the valve 57. By balancing the inert gas flow using the valve 66 against the monomer gas flow, the tapered side of the dielectric coating strips can be controlled.

Figure 6:
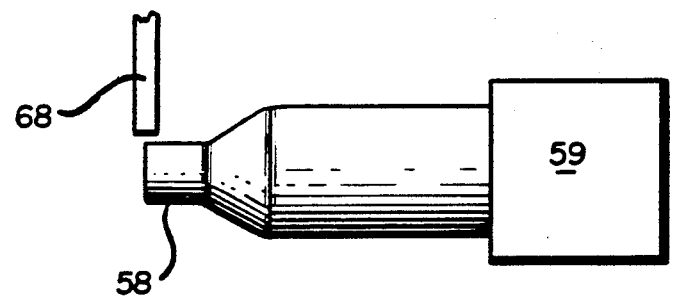
FIG. 6 is an alternate apparatus to that shown in FIG. 5.

An alternate arrangement for atomizing the liquid monomer is suggested in FIG. 6 wherein the monomer is directed through a capillary tube 68 to a point closely adjacent the horn 58 of the ultrasonic atomizer 59. In this arrangement, a meniscus is formed between the end of the capillary tube 68 and the end of the horn 58, and the monomer is drawn uniformly through the tube.

Another system which is preferred for atomizing the liquid monomer is shown in FIG. 62 in which monomer is directed through capillary tube 200 to a point closely adjacent ultrasonic atomizer 201. The monomer droplets are atomized ultrasonically and the droplets vaporized by the means of heating elements 203, 204 which heat the walls of atomization chamber 205. The vaporized monomer passes through a top hat shaped baffle 206, screen 207 and nozzle 208, where it condenses on the movable support, not shown. Nozzle 208 is shaped to conform substantially to the shape of the surface of the movable drum.

Other systems which may be utilized for depositing a monomeric film on a substrate are disclosed in pending application Ser. No. 877,175 filed June 20, 1986 of Angelo Yializis entitled "Flash Evaporation of Monomer Fluids", pending application Ser. No. 900,941 filed Aug. 25, 1986 of Gregg Bischoff entitled "Monomers Atomizer For Evaporation", pending application Ser. No. 850,427 filed Apr. 8, 1986 entitled "Atomizing Device For Vaporization of Mooyoung Ham", and Carrico U.S. Pat. No. 4,682,565 issued July 28, 1987 entitled "Vapor Nozzle With Gas Barrier Bars", all of said applications and patent being commonly assigned and the disclosures of which are incorporated by reference herein.

The condensed liquid monomer is radiation cured by the second system 33 in the dielectric forming zone. Each layer is substantially cured prior to the deposit of a subsequent layer of monomer or metal. The curing is controlled so that only the top layer is cured without any substantial effect on the underlying deposited material. The curing is controlled by matching the electron beam voltage to the dielectric thickness. For example, a 10 Kv electron voltage can penetrate about 1 micron of monomer without substantial penetration of the layers beneath. This individual layer curing serves to improve the quality of the plurality of the multi layer structure since additional irradiation of cured layers serves to break polymer bonds and degrade the cured layers.

If desired, however, multiple layers of monomer could be deposited on the movable support followed by a single curing operation. In this embodiment, the curing would be controlled by matching the electron beam voltage to the dielectric thickness of all the uncured monomer layers that have been deposited.

The overall operation of the apparatus can now be readily understood. Electrode or metal layers are deposited, coated with dielectric and the dielectric cured, before the surface on which the metal electrode layers are deposited passes again for successive electrode or metal layers and dielectric coatings. Desired thicknesses of the electrode layers and dielectric coatings are determined by matching the rate of vapor deposition with the surface speed of the drum 35.

It will be apparent that the capacitors 10 are truly miniature capacitors having, nevertheless, useful levels of capacitance. Those familiar with the art will understand that the apparatus and methods disclosed economically produce the capacitors 10 in the sense that high speed production is possible of large numbers of capacitors simultaneously, as well as in the sense that each individual capacitor uses little raw material. Despite the small size of each capacitor, there is, in the design of that capacitor, a usable workable area for securing wire leads so as to complete the assembly. Since the capacitor is made up solely of metal and cured temperature resisting resin, they are capable of withstanding substantial temperatures including those temperatures for a limited time resulting from wave soldering assembly techniques.

As a result of the very small dimensions involved in the thicknesses of the electrode layers and dielectric coatings, the capacitor 10 has the property of being self-healing. That is, should a defect exist in a dielectric coating permitting a small amount of metal to electrically connect electrode layers in the opposite sets, the application of current could be expected to burn or melt the very small cross section of connecting metal so as to open the defect. As a result, it is highly unlikely that the capacitor will fail by shorting out.

Figure 7:
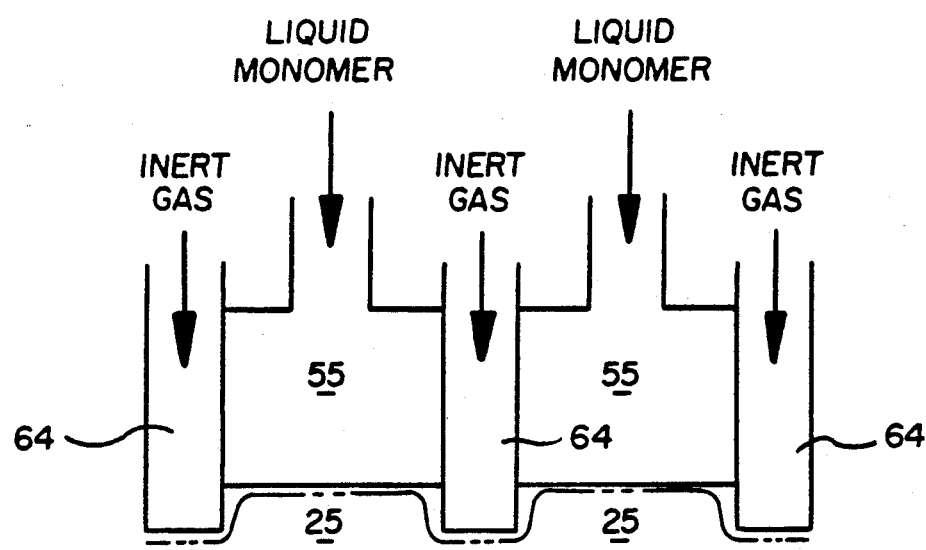
FIG. 7 shows a fragmentary diagram of a portion of the apparatus shown in FIG. 2 relating to the nozzle of the monomer evaporation system.
Figure 10:
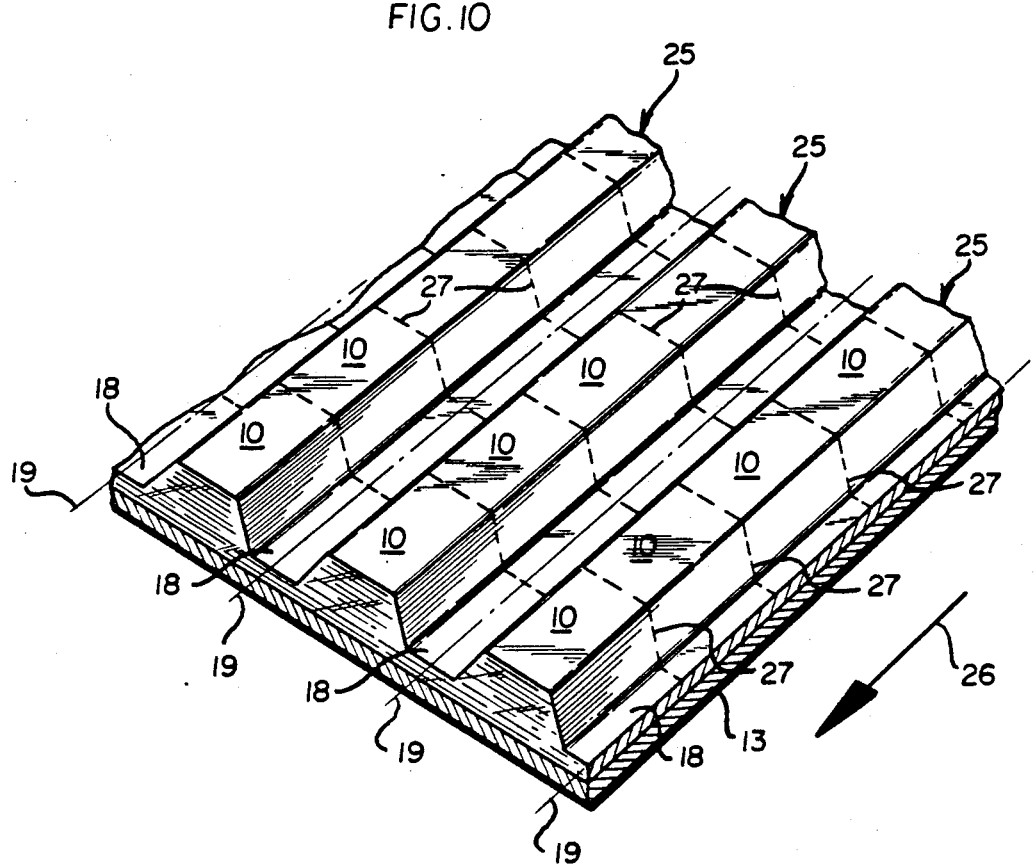
FIG. 10 is a fragmentary perspective view of a structure of the FIG. 1 capacitors in the form in which they are manufactured.
Figure 13:
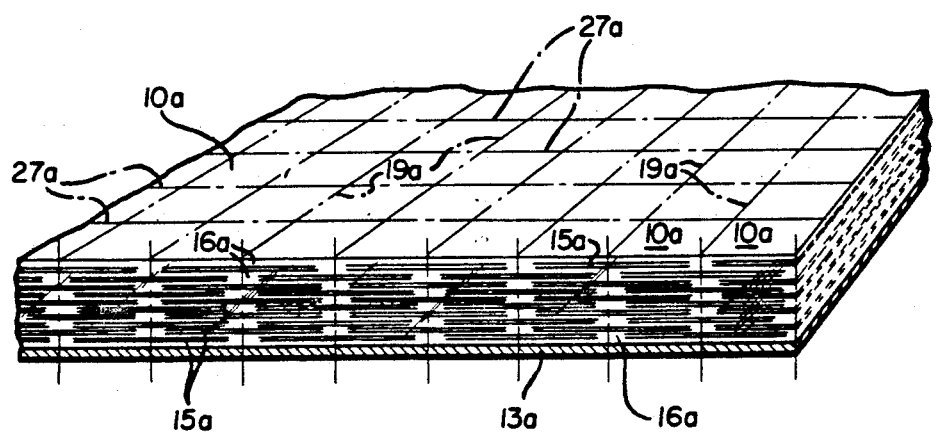
FIG. 13 is a perspective view similar to FIG. 10 but showing an alternative capacitor structure manufactured in a similar manner.

The apparatus and methods described above can also be advantageously employed to form capacitors in a full width configuration as opposed to the lane configuration of FIG. 7, FIG. 1 and 10. As shown in FIG. 13, where elements similar to those already described have been given the corresponding reference numeral with the distinguishing suffix a added, capacitors 10a can be formed on a substrate 13a having both the conductive layers 15a and the dielectric coatings 16a of uniform thickness. Separating individual capacitors 10a along cut-off lines 19a and cross cut lines 27a exposes the edges of the conductive layers 15a and therefore some form of edge termination is required to electrically connect the interleaved layers 15a at the opposite ends of the capacitor.

While apparatus and methods described in association with that apparatus are available to produce a structure of the present invention, other embodiments of the apparatus and method also serve to provide a multi layer structure of the present invention. Turning to FIG. 2a, which shows a preferred system, there is shown within a vacuum environment in a vacuum chamber 101a or a housing divided into vacuum portions, a movable support in the form of a rotatable drum 100 having a cooled surface 101 driven by a motor, not shown. A liquid monomer delivery, metering and deposit system 102, a monomer curing system 104, and a metal or inorganic material deposit system 106 are also shown. The movable support 100, the vapor outlet of the monomer flash vaporizer, the curing means 104 and the inorganic material deposit apparatus 106 are disposed within the vacuum environment.

Drum 100 continuously rotates the cooled drum surface 101 through an upstream polymer layer forming zone. The region in which surface 101 passes the monomer condensation and downstream curing systems 102, 104 constitutes the polymer layer forming zone whereas the region in which the drum surface 101 passes the inorganic material deposit system 106 constitutes the inorganic or metal forming zone.

Figure 2:
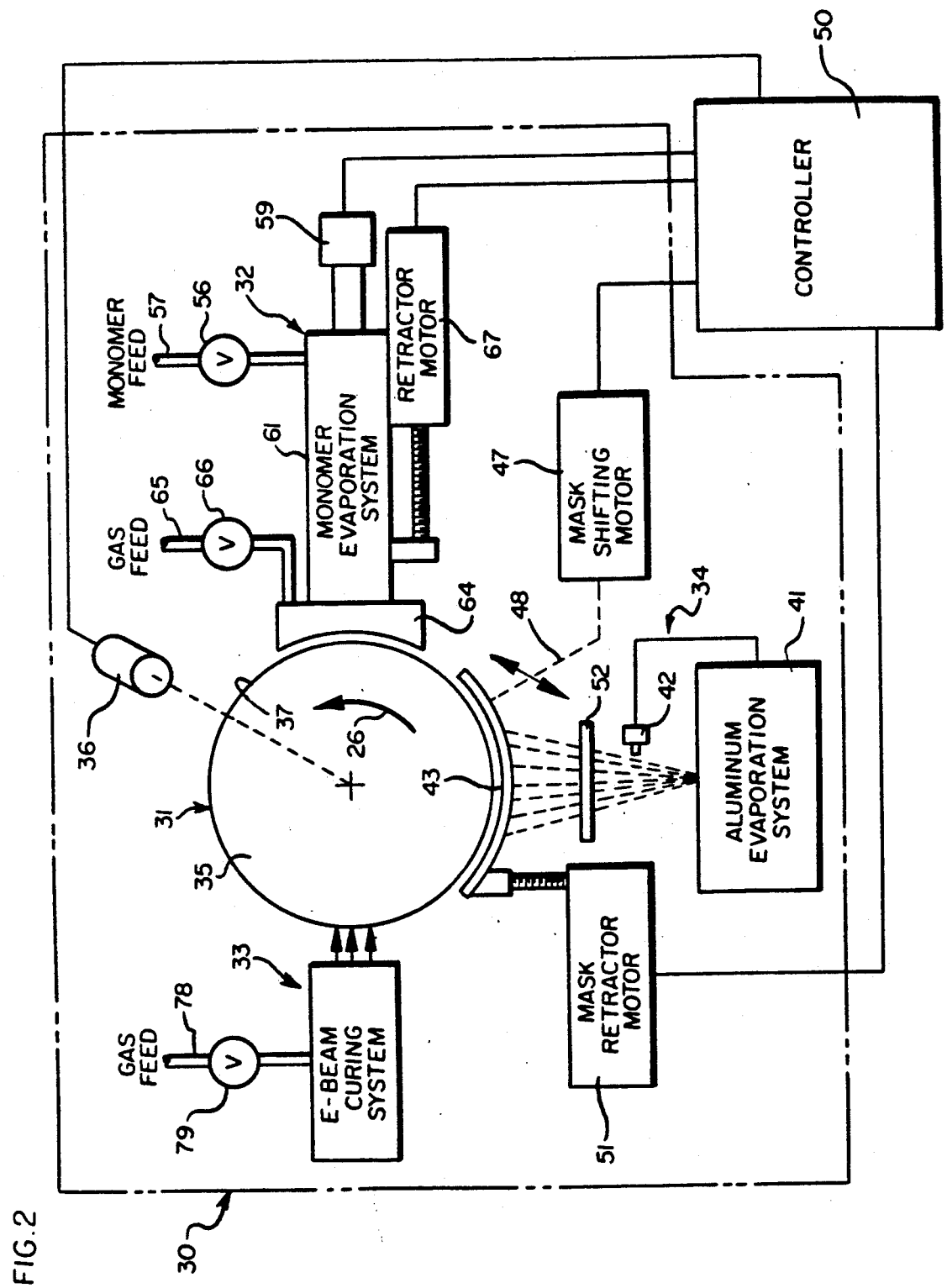
FIG. 2 shows a schematic view of one embodiment of apparatus and system for carrying out the process of the invention.
Figure 2A:
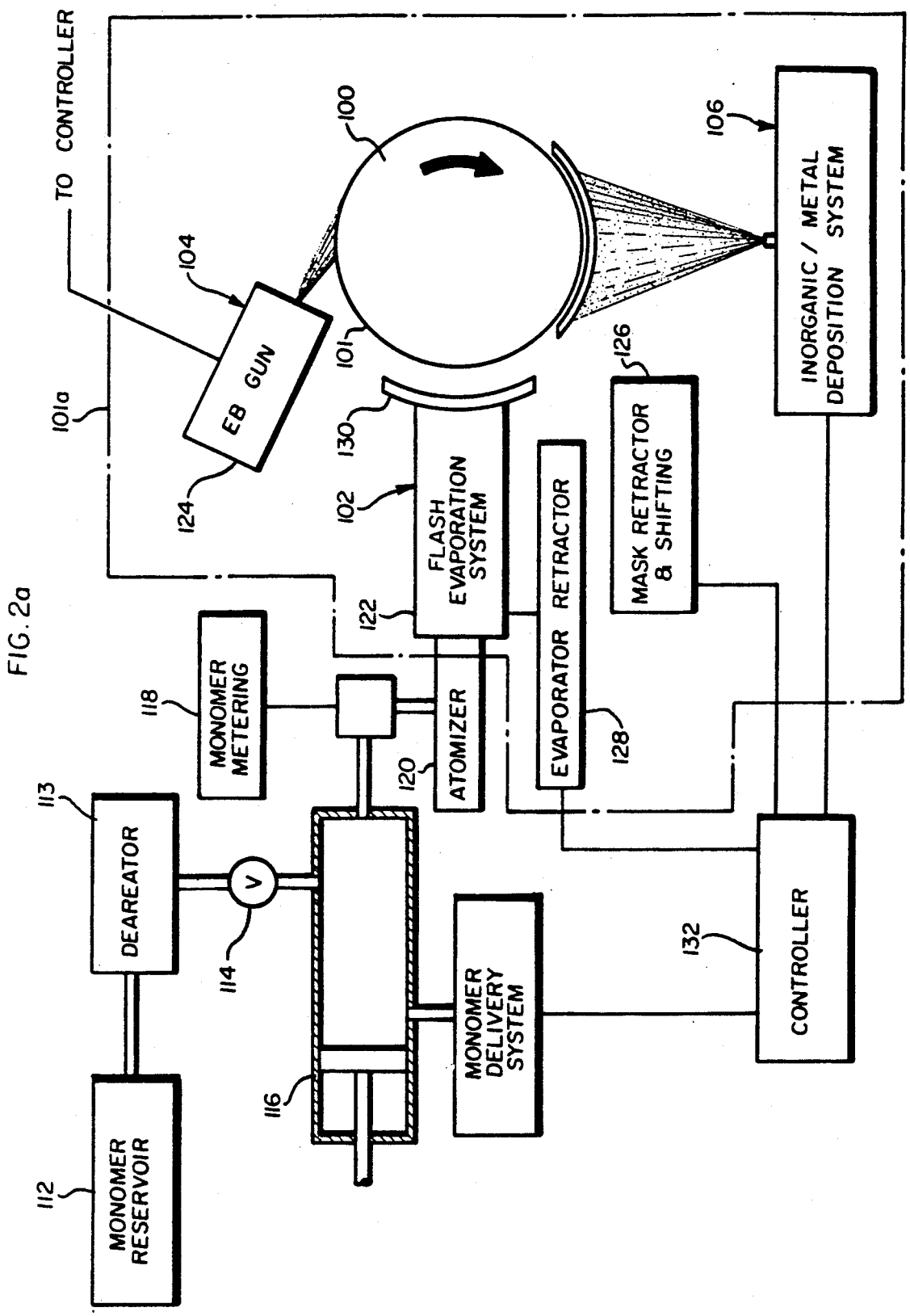
FIG. 2a shows a schematic view of a second preferred embodiment of apparatus and system for carrying out the process of the invention.
Figure 2B:
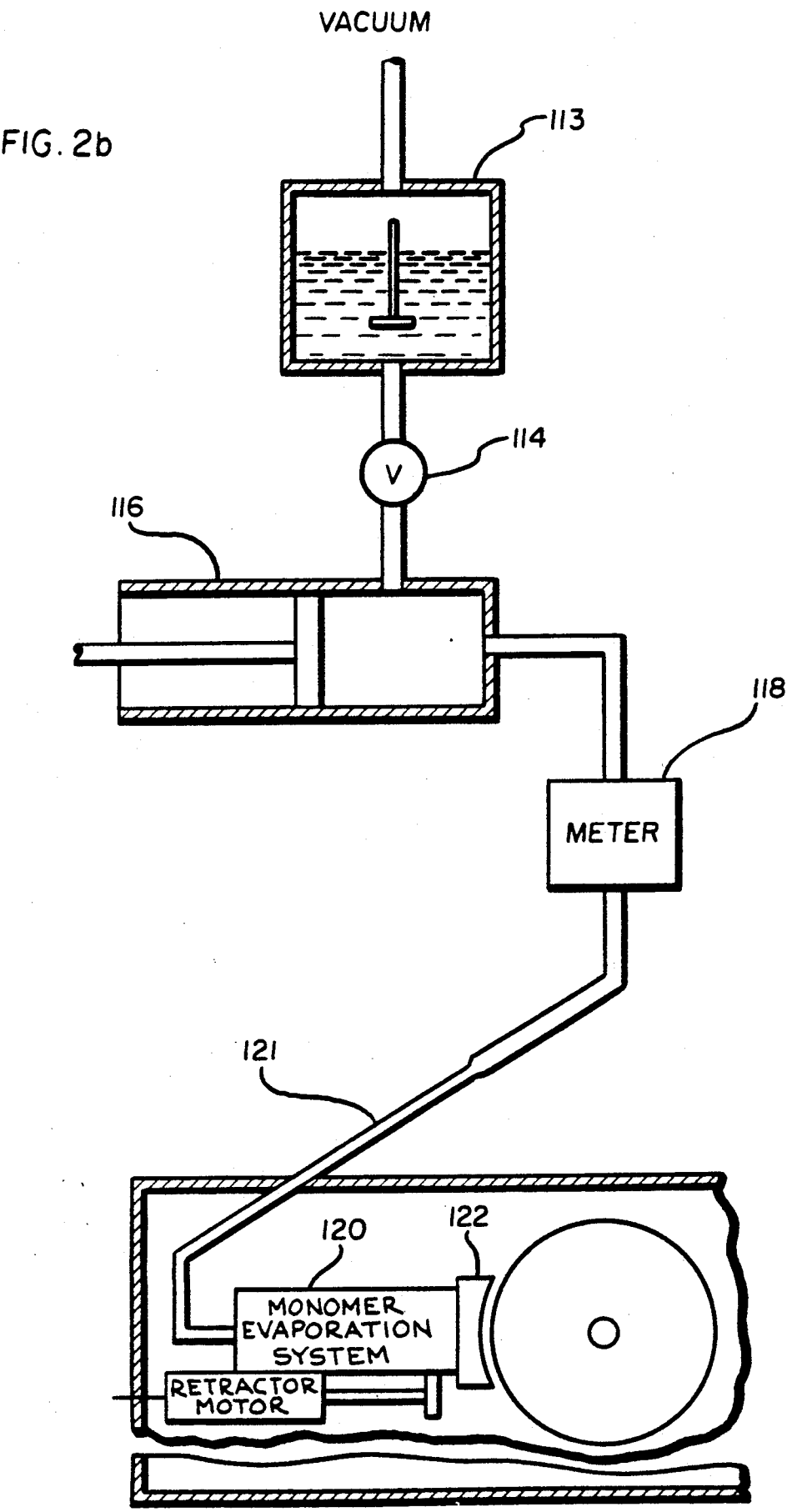
FIG. 2b shows a fragmentary schematic view of an embodiment of a monomer feeding system for depositing a metered amount of monomer to be deposited on a movable support.

Referring to FIG. 2a and 2b, a liquid monomer at room temperature is deposited in reservoir 112 where it passes to a deaerator 113 where the monomer is stirred and degassed at a temperature of about 25° C. by pulling a vacuum to remove gases entrained in the monomer to preclude, insofar as possible, any pressure variation in the monomer evaporator. The monomer then passes through valve 114 to a conventional piston pump 116 which pumps the monomer under suitable pressure and temperature to a monomer metering means 118 which meters a desired amount of monomer to ultrasonic atomizer 120 through constricted conduit 121 which provides a positive back pressure for the monomer entering atomizer 120. The monomer is atomized and forms micro droplets which are heated to an appropriate temperature, approximately 100°–400° C. for the acrylate resins referred to above. The droplets are instantaneously vaporized, i.e., flash vaporized, in evaporator 122 to minimize the opportunity for polymerization and the vaporized monomer passes through nozzle 130 and condenses on the cooled drum surface 101. A flow rate of the monomer through the constriction 121, generally in the range 0.5 to 10 cc/min. has been found satisfactory with the flow rate being dependent upon the speed of the movable support, the desired layer thickness, and the width of the deposit. The monomer is metered in order that the amount of monomer entering atomizer 120 will be the optimum amount deposited on the movable support. It is important that the metered monomer material is deposited on the moving substrate as opposed to the monomer being polymerized on the walls of the evaporator which can adversely affect the production of a multi layered article.

The condensed monomer liquid subsequently is radiation cured in the polymer or dielectric forming zone which includes a radiation source, preferably a gas discharge electron beam gun 124. Activation of gun 124 causes a flow of electrons to be directed onto the monomer thereby curing the material to a polymerized cross linked form. In this particular embodiment, the gun is positioned to be aligned tangentially to the drum surface 101 in order that the flow of electrons contact the monomer tangentially as opposed to the 90° angle disclosed in FIG. 2. It has been found that by positioning the gun in the manner described for the embodiment of FIG. 2a, the surface charge is reduced; charging defects are eliminated; and, a more uniform cure from the top to the bottom of an individual monomer layer is achieved without penetrating adjacent layers with electrons.

The cured monomer then passes to the inorganic material deposit system 106 where an inorganic material such as aluminum 200–500 Angstroms thick can, if desired, be deposited on the cured monomer layer. The mask retraction and shifting system 126 and evaporation retractor 128 shown in FIG. 2a are the same systems retractor and shifting systems disclosed and shown with respect to the inorganic metal deposition system shown in FIG. 2.

A controller 132 is connected to the drum motor, not shown, for sensing drum revolution and the controller 132 supplies the appropriate shifting to the mask retraction and shifting means. Moreover, the controller serves to provide the appropriate signals to the monomer delivery system, flash vaporization retractor 128, which positions the vaporizer the desired distance relative to the drum surface, and the electron beam curing system for activating the curing system.

Figure 2C:
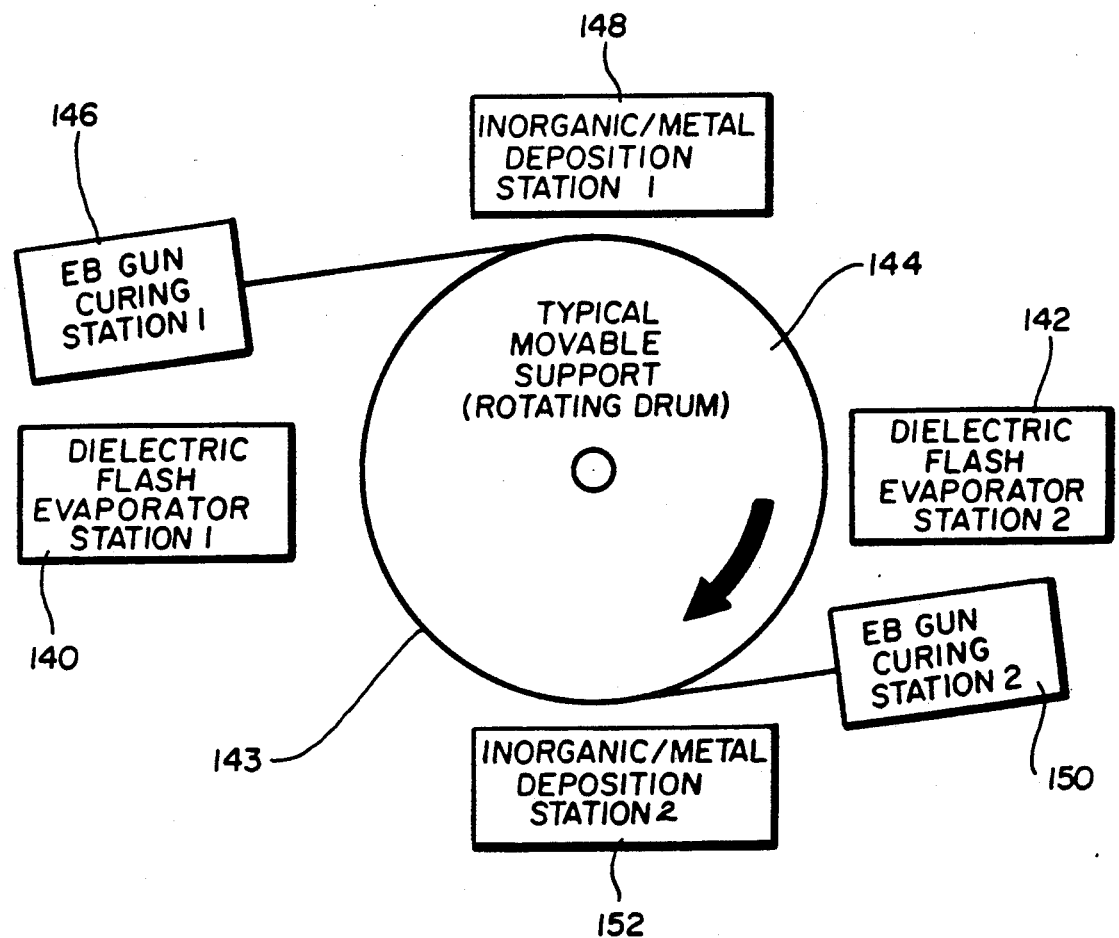
FIG. 2c shows a schematic view of a third embodiment of apparatus and system for carrying out the process of the invention in which two monomer deposition stations, two curing stations and two inorganic material deposition stations are utilized in carrying out the process of the invention.

FIG. 2c shows a further embodiment of apparatus for forming a multiple layer structure. In this particular embodiment, first and second monomer deposition and flash evaporization systems 140, 142 are utilized for depositing the same or two different monomer materials, heretofore described, onto water cooled drum surface 143 of rotatable drum 144. More specifically, subsequent to deposition of a monomer material on surface 143 by evaporation at station 140, the deposited material passes to electron beam curing station 146 where the monomer is cured and cross linked. The cross linked monomer then passes to an inorganic material deposit station 148 where an inorganic material can, if desired, be deposited on the cured monomer as heretofore described.

Similarly, the monomer condensed onto drum surface 143 from the monomer deposition station 142 passes to an electron beam curing station 150 where the monomer layer is cured after which the cured monomer passes to the inorganic material deposit station 152 where an inorganic material can, if desired, be deposited onto the cured monomer layer.

It is appreciated that while two monomer deposition and curing stations and two inorganic material deposition stations have been shown, other embodiments could be employed, if desired, which utilize different combinations of monomer deposition stations, monomer curing stations and inorganic material deposition stations.

Further, it is appreciated that different shapes and sizes of multi layer structures aside from those shown in FIGS. 1, 10 and 13 can be made utilizing the process and apparatus disclosed and claimed herein.

Figure 2D:
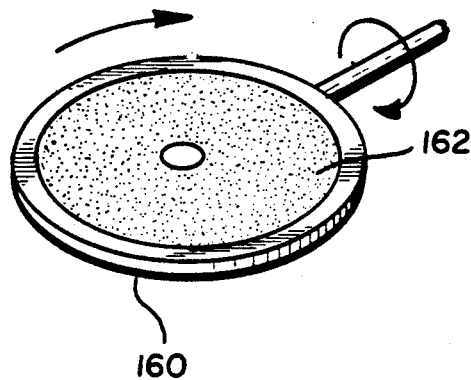
FIG. 2d shows a fragmentary perspective view of another embodiment of a movable support with the support being a rotatable disk.
Figure 2E:
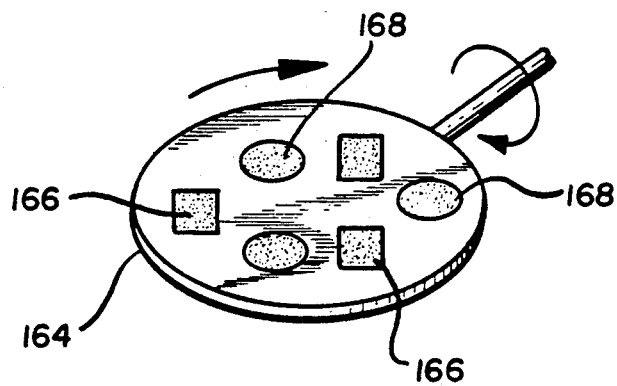
FIG. 2e shows a fragmentary perspective view of a further embodiment of a movable support with the support being a continuously or intermittently indexed rotatable disk.

If desired, the rotatable drum shown in FIGS. 2 and 2a need not be utilized but rather other means could be employed for the movable support. For example, referring to FIG. 2d there is shown a rotatable disk 160 which could serve as a movable support with a multi layer structure 162 being formed on the disk. Again, turning to FIG. 2e there is shown a disk 164 which is adapted to be rotated continuously or indexed intermittently at a desired speed past deposition and curing stations heretofore described to provide a number of multi layer structures 166, 168.

Figure 2F:
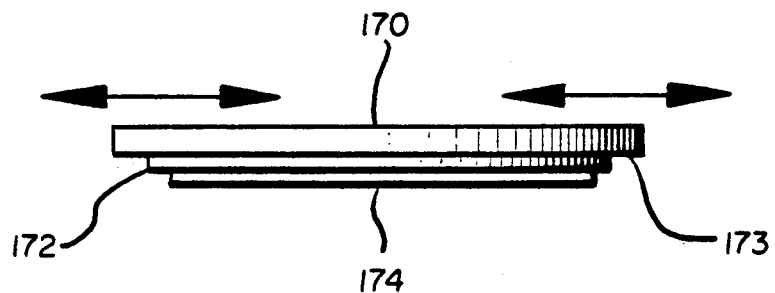
FIG. 2f shows a fragmentary perspective view of yet another embodiment of a movable support with the support being a reciprocating plate with the multi layer structure being deposited on a substrate located on the bottom wall of the plate.

FIG. 2f shows a movable support which comprises a reciprocating plate 170 having a substrate 172 attached to a cooled surface 173. A multiple layer 174 structure is deposited on substrate 173.

Figure 2G:
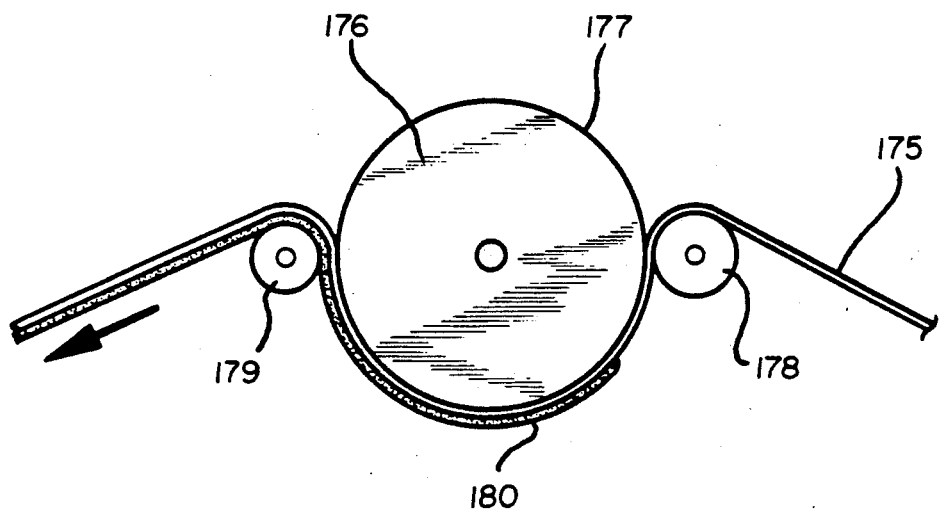
FIG. 2g shows a fragmentary perspective view of still another embodiment of a movable support in which a moving web substrate serves as the support and a multi layered article is deposited on the bottom wall thereof.

FIG. 2g shows a rotatable drum 176 with a water cooled surface 177. A moving web substrate 175 passes over rollers 178, 179, the rollers serving to maintain the moving substrate in contact with the drum surface so that it can be cooled by the drum. While the substrate is in contact with the drum surface, a multi layer structure 180 can be formed on the moving substrate.

It is appreciated that other structures for movable supports, aside from those shown and described herein, could be utilized by a person of ordinary skill in the art.

Figure 2H:
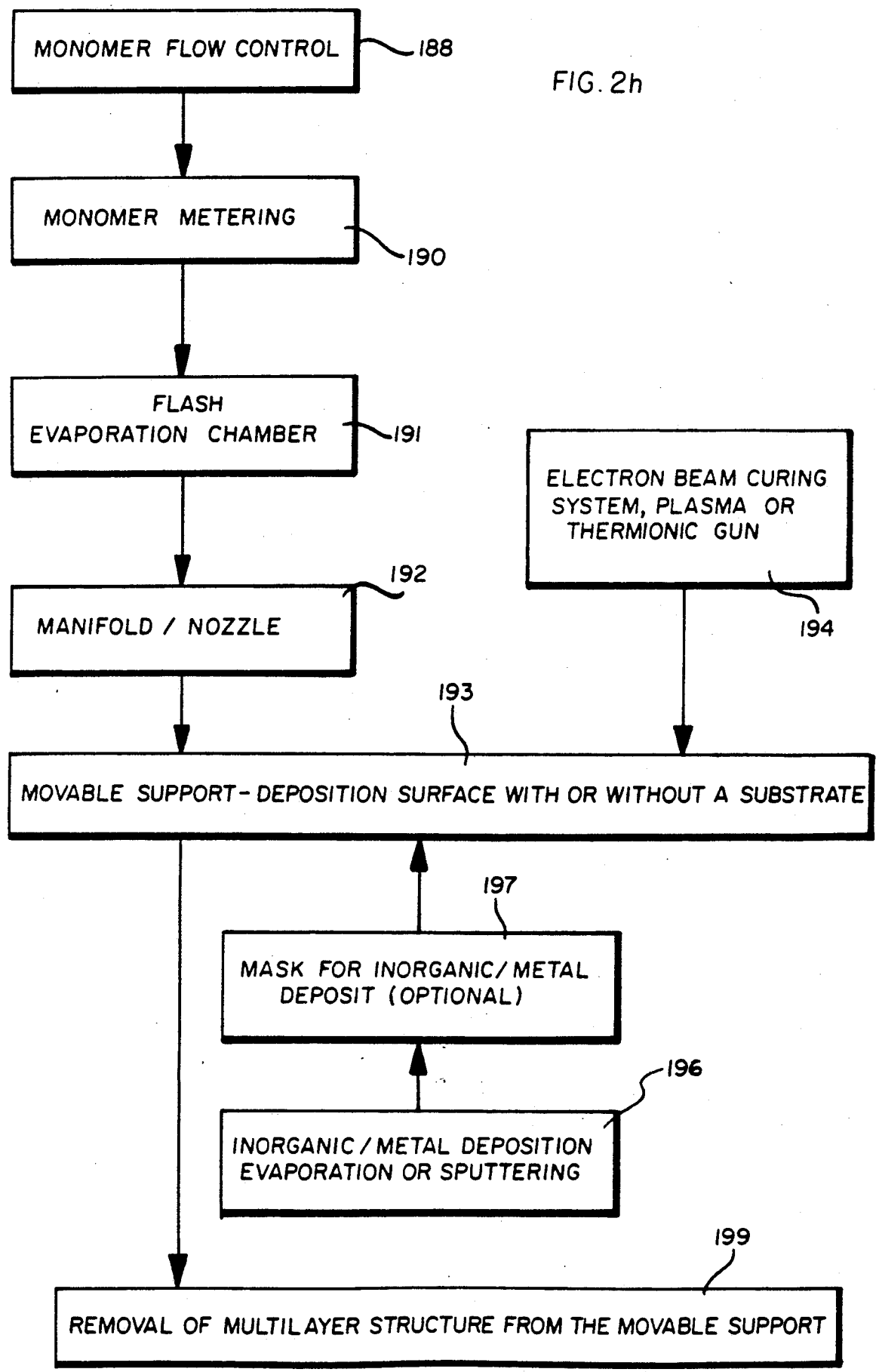
FIG. 2h shows a block diagram of the process steps for making a multi layered article according to the process of the present invention.

Turning to FIG. 2h there is shown a block diagram of the steps of the process. As described, the process, which is carried out in a vacuum environment, includes having a monomer material 188 in a reservoir as heretofore described flow to a metering station 190 where a selected amount of monomer is metered, and then passed through a constrictor as previously described to an atomizer. The atomized monomer passes to a flash vaporization chamber 191 and through a manifold or nozzle 192 onto a movable support 193 which, if desired, has a substrate mounted on the support surface.

Following condensation of a film of monomer having a desired thickness onto the support surface or substrate, the movable support passes to a monomer curing station 194 whereby means of an electron beam curing system, plasma or thermonic gun, the monomer is cross linked and cured.

Subsequently, the cured monomer passes an inorganic material deposition station 196 where, if desired, metal or other inorganic material, is deposited through an optional mask means 197 by means of evaporization or sputtering onto the cross linked monomer.

The process is repeated with the suitable number of layers being generated after which the multi layered structure 199 is removed from support 193 and subjected to such additional cutting and trimming as required. A multi layer structure is thus fabricated comprising upwards of 4,000 layers with each layer varying in thickness from about 0.1 to 4 microns, the structure having been manufactured utilizing the high speed process of the present invention with the individual layers being substantially delamination free and pin hole/void free. Further, the multi layer structure is a self supporting structure and need not be attached to a substrate. Moreover, the various layers can differ in thickness and, if desired, each individual layer can be non-uniform in thickness.

Figure 14A:
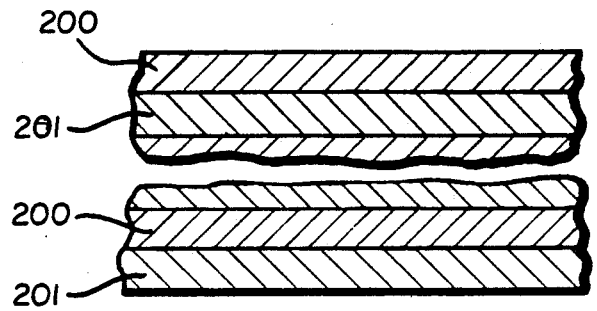
FIG. 14a shows a fragmentary cross section view of a multi layer structure made according to the process of the present invention in which the structure is formed of two polymeric or dielectric materials.

A variety of different size and shape multi layered structures formed by the process and apparatus disclosed herein are available. FIG. 14a shows a fragmentary section view of a structure formed with an overall shape such as shown in FIG. 10 and 13 in which two monomer components from the group of materials referred to herein previously are utilized to form the thin multi layer structure having two dielectrics 200, 201. The structure can be formed utilizing the system shown in FIG. 2c in which two monomer deposition 140, 142 and curing stations 146, 150 can be employed, if desired, to deposit and cure the monomer films.

Figure 14B:
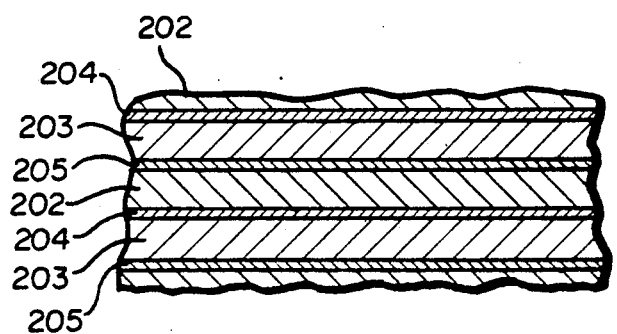
FIG. 14b shows a fragmentary cross section view of a multi layer article of the present invention in which the structure is formed having layers of two polymeric or dielectric materials with two inorganic metal layers interleaved between the two polymeric materials.

The multi layer structure shown in FIG. 14b, which serves as the flash vaporization system shown in FIG. 2, comprises layers 202 and 203 made of two monomer components and inorganic layers 204 and 205 which alternate with each other and interleave the dielectric layers. The layers 204 and 205 each comprise a different inorganic material. This structure, like the multi layer structure of FIG. 14a can be generated using the flash vaporization system shown in FIG. 2b or 2c.

Figure 14C:
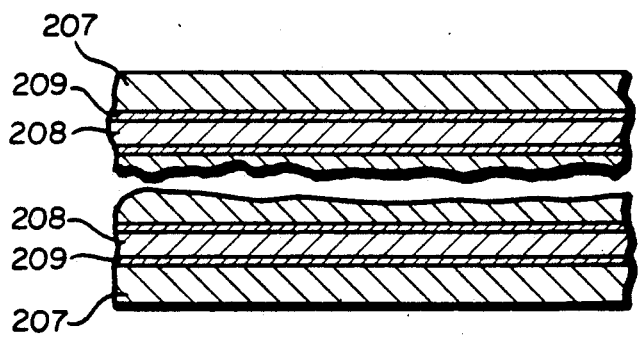
FIG. 14c shows a fragmentary cross section view of a multi layer structure similar to the structure of FIG. 14b except that the dielectric layers are different thicknesses and only one metal layer is utilized.

FIG. 14c shows a multi layer structure in which the dielectric layers are formed from materials 207, 208. An inorganic material layer is interleaved between the dielectric layers. Additionally, dielectric layer 208 is less in thickness than dielectric layer 207.

Figure 14D:
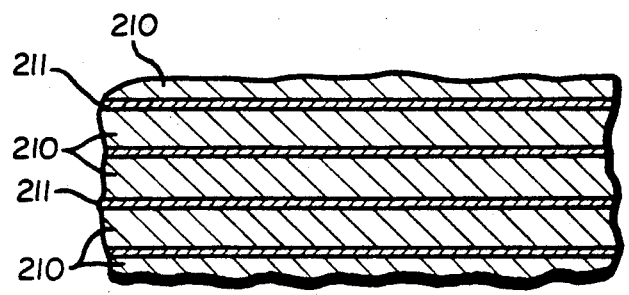
FIG. 14d shows a fragmentary cross section view of a multi layer structure of the present invention in which only one polymer layer material and one inorganic material are utilized to form the multi layered structure.

The multi layer structure shown in FIG. 14d utilizes a plurality of dielectric layers 210 all made from one monomer component with an inorganic layer 211 interleaved between the dielectric layers.

A multi layer structure also has been made in which the cured film is water clear throughout the structure to provide a relatively transparent structure.

EXAMPLE I

In one instance an oxidized copper foil substrate approximately 20 mils thick and ten inches wide was attached to a hot drum surface having a diameter of about 38.1 cm, the drum surface being about 52° C. Once the foil was secured, the drum temperature was lowered to about 18° C. at which time the nozzle for the deposition of the monomer was set at about 0.01524 cm from the substrate surface after which it was retracted 20 mils until the evaporation nozzle was heated to the desired temperature.

The system was brought to pressure with the flash evaporator and nozzle, heated to about 343° C. The electron beam curing gun power supply was set at 8 Kv and 10 ma.

Following heating, the evaporator and nozzle with gas bars to maintain the stack profile were moved back to the 0.01524 cm gauge point and propoxylated cyclohexane dimethanol diacrylate (C-9024) was fed into the evaporator at a rate of 1.75-2.0 gm/min.

The monomer was flash vaporized at about 343° C. onto the foil substrate and condensed. The condensed monomer film was cured as the foil rotated past the electron beam gun at a continuous drum speed of about 100 cm/sec. Multiple layers of dielectric with uniform layer thickness each of about 1 micron thick were deposited. As each layer was deposited the nozzle was retracted. The layers were deposited between the gas bars and the deposition and curing was repeated approximately 1,300 times in a single procedure. Four individual stacks, each about 0.635 cm wide of dielectric were prepared at one time using this procedure to provide a multiple layer structure of the type shown in FIG. 10. The structure was pin hole and void free and was also substantially delamination free and provided good moisture resistance.

Four thousand layers have also been deposited successfully by this procedure.

EXAMPLE II

The procedure of Example I was followed with a dielectric layer formed in which a single monomer component (C-9024) was deposited and cured. Following the initial formation of about 100 dielectric layers, each about 0.8 microns thick, a layer of aluminum, approximately 200–500 Angstroms thick, was deposited before the next dielectric layer was deposited to provide a structure such as shown in FIGS. 1, 1a and 10. After the initial 100 layers of dielectric was deposited, 1,200 aluminum layers interleaved with 1,200 dielectric layers were deposited. Fifty dielectric layers were then deposited to complete the structure which had approximately 1,350 dielectric layers. Upon completion, the structure was removed from the rotatable drum and slit to size. Leads were attached to the chips and capacitance was measured at 1.0 mf. over a 5×5 mm active area with a dissipation factor at 1 KH$_z$ of 1.5%. The completed multi layer structure was substantially delamination free and provided good moisture resistance.

EXAMPLE III

In this example, the procedure for Example I was followed; however, the monomer was deposited directly on the drum surface as opposed to depositing monomer on a substrate.

Figure 6A:
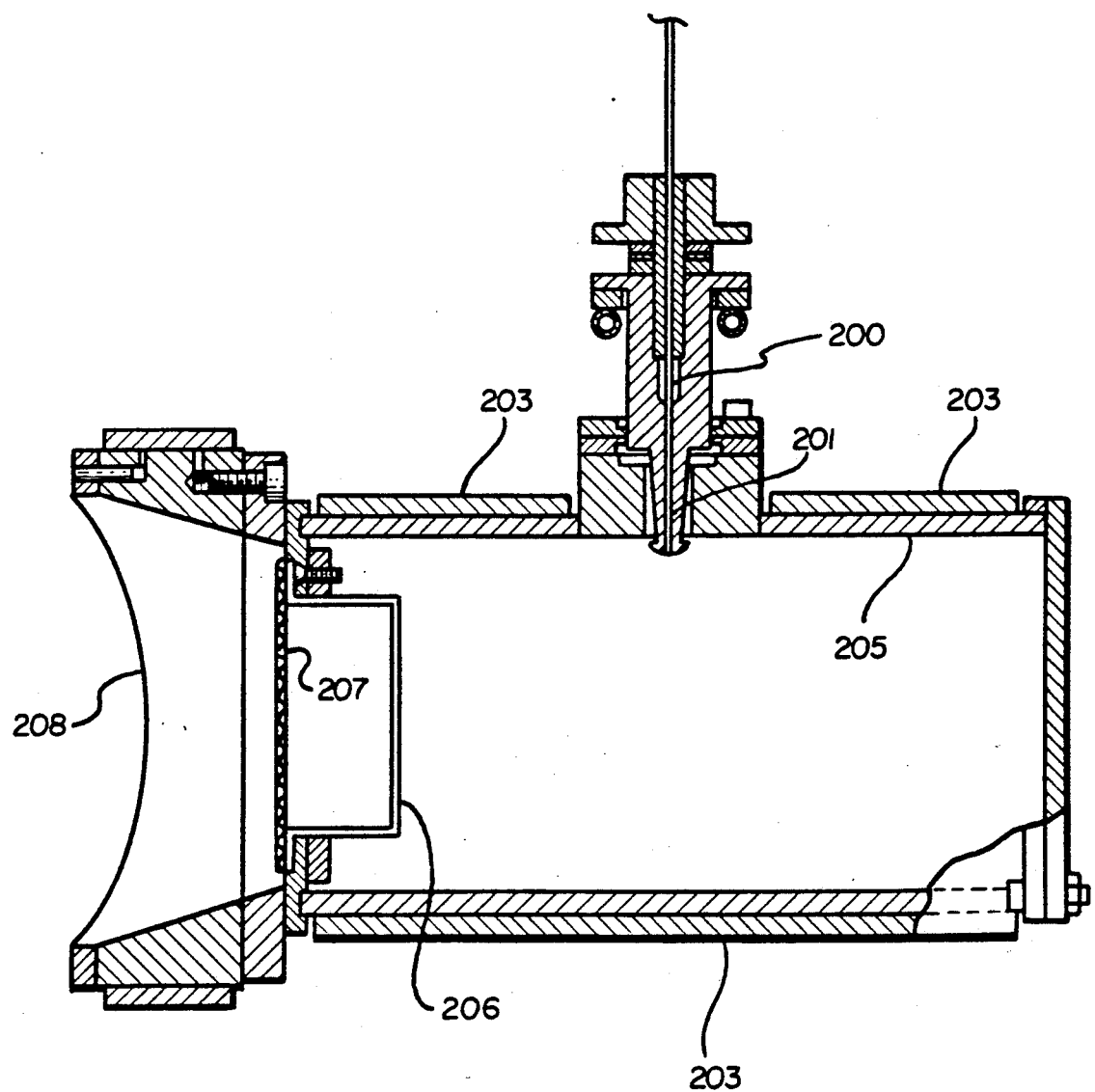
FIG. 6a shows an enlarged partially sectioned, diagram of a preferred dielectric flash evaporator apparatus.

A nozzle having the configuration such as shown in FIG. 6a with a slit 0.635 cm in the vertical and 12.7 cm in the horizontal is gauged to the drum surface, i.e., 0.01524 cm and then retracted 20 mils. The drum surface temperature was 4.444° C.

Once the system was brought to pressure, and the nozzle heated to 343° C., the flash evaporator and nozzle were moved back to 0.01524 cm of the drum surface. The drum surface speed was 101.6 cm/sec. The electron gun supply was set at 10 Kv and 5 ma and a monomer component comprising propoxylated cyclohexane dimethanol diacrylate (C-9024) was fed into the evaporator at 2.5 gm/minute and flash vaporized and condensed on the drum surface. The monomer film was 1.0 micron thick and as each layer of monomer was deposited, the nozzle was withdrawn 1.0 micron. The monomer was cured at the electron beam gun station.

Thirteen hundred layers of dielectric were deposited to form a five inch strip having a configuration of the type shown in FIG. 13, the edges of the structure being slightly tapered. The resulting structure, when removed from the drum, was self-supporting, substantially delamination free and void/pin hole free.

EXAMPLE IV

The procedure outlined for Example III was followed, however, aluminum layers, approximately 200–500 Angstroms thick were deposited in the form of narrow strips between layers of dielectric with the structure formed being the configuration shown in FIG. 13 (some of which were 5.080 cm wide and others were 12.7 cm wide) which can be cut into lanes each about 0.5 cm wide. In this instance, structures were made using propoxylated cyclohexane dimethanol diacrylate (C-9024) and other structures were made using hexane diol diacrylate (C-716) that was flash vaporized at about 166° C., which is substantially below the 343° C. utilized for the C-9024 material. Subsequent to manufacture, samples made using both monomer materials were placed in a pressure cooker for 63 hours at a temperature of 125° C. and a pressure of psig with and without exposure to a 240° C. prebake in a nitrogen atmosphere. Tests under these conditions of temperature, pressure and humidity showed that the C-716 monomer material, when used in the process of the present invention, provided a more stable dielectric structure than one made with the C-9024 material. The structure utilizing the C-9024 material, while being adequate for some applications, turned a yellow color and also exhibited some shrinkage which is an indicator of some degradation whereas the structure utilizing the C-716 material remained approximately the same color and size after 63 hours.

It is appreciated that many different sizes and shape multi layered structures can be formed utilizing the process of the present invention disclosed herein. The overall shape may be tapered, square, rectangular, curved or utilize any other shape required by a particular application. Similarly the adjacent layers can be formed as illustrated in FIG. 1a or the layers may be continuous or intermittent across their length or width without departing from the scope of the invention.

The size and shape of the multi layer articles formed by the process of the present invention may vary as desired for a particular application. For example, the interleaved layers may be continuous throughout their widths and lengths or they may be intermittently deposited along their respective widths and/or lengths. Similarly, the edges of the interleaved metal layers extending along the width of the article may be located inward of the edge of adjacent polymeric layers or, if desired, the edge of the metal or inorganic layer may extend beyond the edge of an adjacent polymeric layer.

Further, while several monomer materials are disclosed in the examples disclosed herein, it has been found that the C-716 material appears to be the material of choice. Other monomers that have been utilized to make multi layered structures include diol diacrylates and trimethylolpropane trioacrylate and propoxlated trimethyolpropane triacrylate.

As will be apparent from the dimensions given, even a miniature capacitor of the design shown in FIG. 1, which is less than 1 inch square in outer periphery and a few millimeters thick, can embody many alternate electrode and dielectric layers, up to 1000 or more. The result is a capacitor effective at up to 50 volts with a capacitance in the 0.001 to 100 microfarad range, depending, of course, upon overall size and the number of electrode pairs.

Pursuant to one embodiment of the invention, there are terminal portions 18 on the substrate 13 defining electrical joining sections ending at cut-off lines 19 spaced substantially from the opposite, and separated, edges of the central capacitance region 17. The coatings, as shown in FIG. 1, 16 taper from uniform thickness in the uniform capacitor region 17 to zero thickness adjacent the terminal portions 18, so that the capacitor has sloped portions 21. The spacing of the cut-off lines 19 and the terminal portions 18 from the central capacitance region 17 is sufficient so that the uppermost coating 16 in a given capacitor has a horizontal dimension, horizontal being the plane of the substrate 13, that permits the acceptance of a final conductive layer in the sloped portions 21. That is, assuming the electrode material will be vapor deposited virtually perpendicular to the substrate 13, and that the layers in the sloped portions 21 will be steeper and steeper with respect to the substrate as additional layers are built up, the initial capacitor region-cut-off line spacing must be great enough so that the final electrode layer is not required to be vertical to the substrate. In practice, when working with coatings and layers having the thickness indicated, it is desirable to space the terminal portions 18 at least 10 microns from the central capacitance region 17, or else control of the coatings and layers 15, 16 in the sloped portions 21 becomes difficult and the resulting structure build-up unreliable.

Figure 4A:
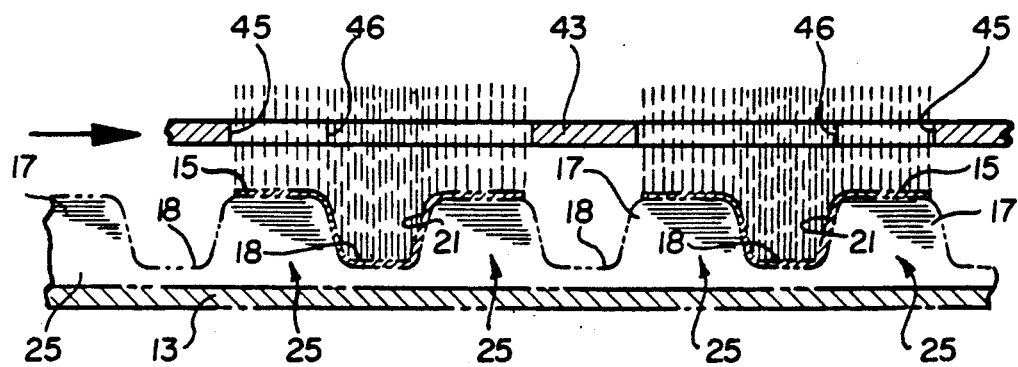
FIGS. 4a and 4b are views showing cross sections of a portion of the apparatus shown in FIG. 2 illustrating alternate positions and the resulting modes of operation of the mask relative to the structure or article.
Figure 4B:
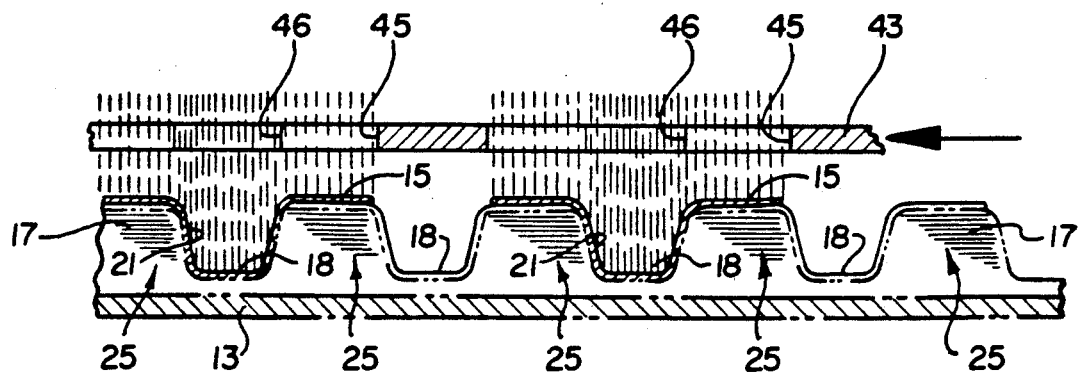

It also can be seen from FIG. 1 that the dielectric coatings 16 can be built up by depositing a coating strip at the same relative position of the substrate 13 after each strip of electrode material has been deposited. To create the interleaved sets of electrode layers in one depositing pass, electrode material is deposited in every other terminal portion 18 and the adjacent capacitor regions 17, and in the next pass, after an intervening dielectric coating, electrode material is deposited in the terminal portions 18 not previously receiving material and in each adjacent capacitor region 17 (See FIGS. 4A and 4B).

The openings 44 in shadow mask 43 used to deposit aluminum vapor electrode material have a main portion 45 wide enough to span the capacitance regions 17 in two adjacent lanes 25 as well as the intermediate terminal portions 18. As the capacitors are built up, the sloped portions 21 become greater in surface area and more aluminum is required to lay down an integral layer capable of carrying current. This is achieved by forming the mask openings 44 with an extension 46 spanning adjacent sloped portions 21 and the intervening terminal portions 18. The amount of electrode material deposited is a function of the time the receiving surface is beneath an open portion of the mask 43, and thus more metal is placed on the sloped portions 21 than in the capacitance regions 17.

The alternate pattern of metal vapor deposition discussed above in connection with FIGS. 4a and 4b is obtained by shifting the mask 43 axially of the drum 35 upon each drum revolution. A mask motor 47 or high pressure linear product ion motor such as available from Anorad Corporation, Hauppage, Long Island, N.Y. makes the shifting movement through a simple mechanical connection 48. A controller 50 is connected to the drum motor 36 for sensing drum revolution, and the controller 50 supplies the appropriate shifting signal to the mask shifting motor 47. It is desirable to keep the mask 43 close to the surface onto which the metal vapor is being deposited, and this closeness is maintained by a mask retraction motor 51 which steps the mask away from the surface 37 upon each drum revolution, as signaled by the controller 50, through a distance approximating the thickness of the electrode layer being deposited.

It will be appreciated that the form of capacitor 10a shown in FIG. 13 can be formed by eliminating the inert gas nozzles 64 and uniformly depositing the monomer through the system 32. Because the conductive layers 15a are not sloped, there is also no need for the extension 46 in the shadow mask 43 of the system 34. Otherwise, the capacitors 10a can be made in full width configuration consistent with the width of the systems 32, 33 and 34.

Figure 11:
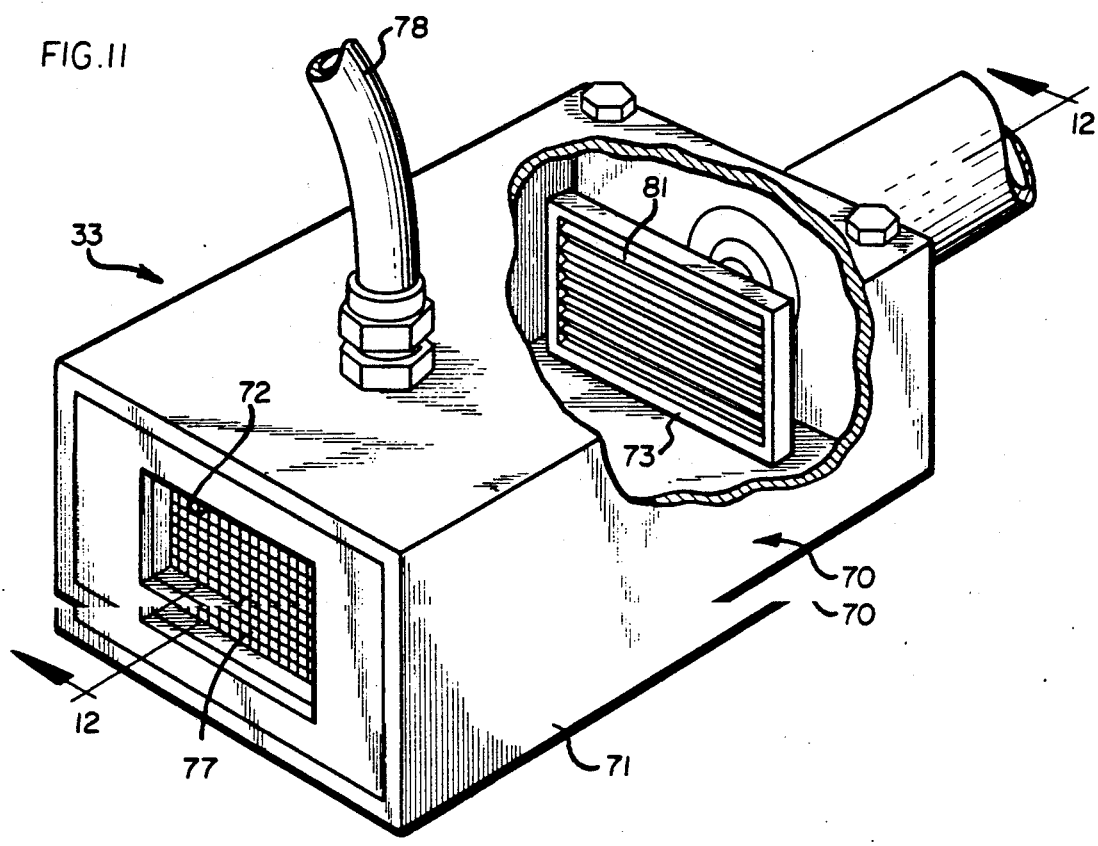
FIG. 11 is a fragmentary perspective view, partially sectioned, of a portion of the apparatus shown in FIG. 2 relating to the electron beam curing system.
Figure 12:
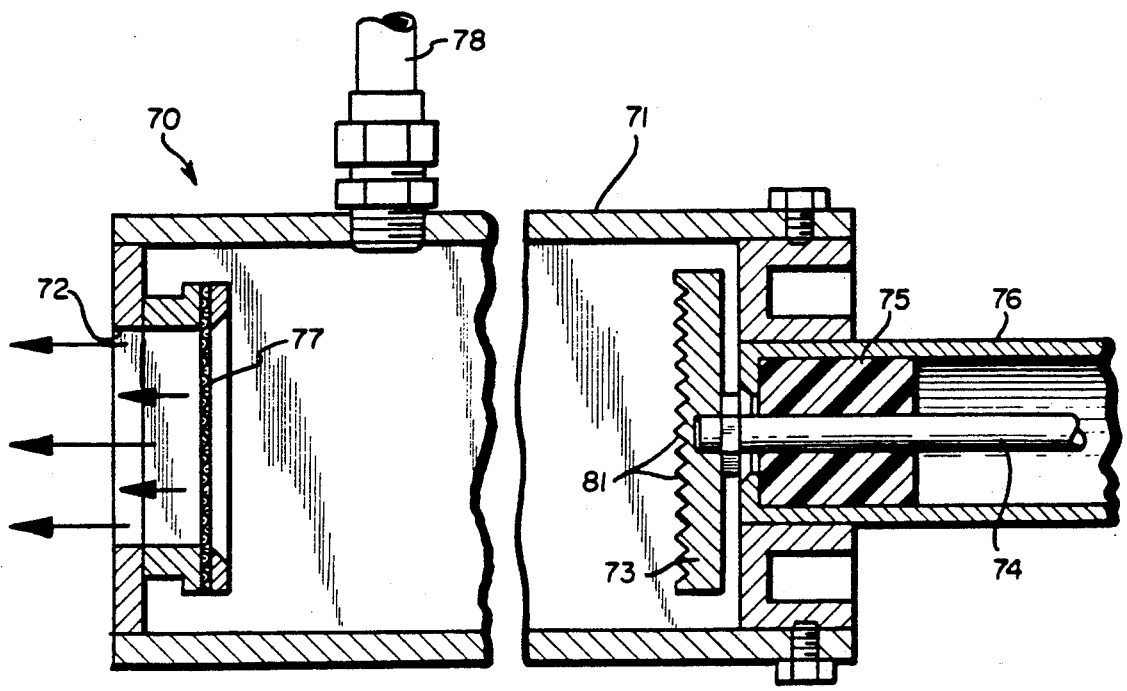
FIG. 12 is a section view taken approximately along the line 12—12 in FIG. 11.

Turning to the second system 33 in the dielectric forming zone, a radiation source, preferably a gas discharge electron beam gun 70 is included (FIGS. 11, 12). The gun 70 directs a flow of electrons from a housing chamber 71 through an emitter window 72 onto the monomer, thereby curing the material to a polymerized cross linked form capable of withstanding the high temperatures to which the capacitors 10 might be subjected.

Gun 70 includes a rectangular copper cathode 73 supported by a connector 74 in an insulator 75 mounted in a ground shield 76 that is fixed to the housing 71. A tungsten mesh extraction screen 77 is fixed across the window 72. A gas such as argon is fed to the housing chamber 71 through a line 78 and a control valve 79. An electrical potential is imposed between the cathode 73 and its connector 74, and the shield 76, housing 71 and screen 77, with the result, keeping in mind the vacuum environment, that a gaseous plasma is created in the housing, primarily between the cathode 73 and the screen 77. The cathode is preferably formed with grooves 81 on its face so that electrons are expelled in a non-linear beam to substantially fill the housing chamber 71. Because of the plasma created, other electrons are stripped from the ionized gas molecules in different portions of the chamber, a so-called field enhanced effect, with the result that electrons at widely varying energy levels are emitted from the window 72. The wide range of energy levels of the emitted electrons is believed to cause the observed effect that the monomer is cured with little surface charging, and avoiding surface charging on the coatings 16 minimizes the possibility of arcing to the electrode layers. It can also be seen that the gun 70 produces a wide beam of electrons so that a number of capacitor lanes can be simultaneously treated. Other types of guns, e.g., thermionic guns, can be employed.

We claim:

1. A high-speed process for forming a multi layered article having a plurality of substantially delamination free, pin hole free and void free layers, comprising the following steps:

(a) providing a vacuum chamber containing: i) a movable support, ii) at least one vapor outlet of a dielectric flash vaporizer mounted adjacent to an upstream portion of said support, iii) at least one curing means mounted adjacent to a downstream portion of said support, and, iv) means for maintaining said support at a temperature below that of said vaporizer;

(b) evacuating gas from said chamber until the pressure within said chamber is less than about $1 \times 10^{-4}$ Torr;

(c) selecting a curable component comprising: i) polyfunctional acrylates, or ii) mixtures of monoacrylates and polyfunctional acrylates, said mixtures having an average of about two or more olefinic groups per molecule, said curable component having: i) an average molecular weight between 150 and 1,000, and ii) a vapor pressure in the range of $1 \times 10^{-6}$ to $1 \times 10^{-1}$ Torr at standard temperature and pressure;

(d) metering a quantity of said curable component into an inlet portion of said vaporizer;

(e) flash vaporizing said component within said vaporizer;

(f) moving said support relative to said vapor outlet and said curing means at a rate of between about 1 cm/sec and 1,000 cm/sec;

(g) condensing a film of vaporized component dispensed from said vapor outlet onto the surface of said support, said film having a thickness of 4 microns or less;

(h) activating said curing means whereby a substantially cross linked polymer film is formed on said support; and, (i) repeating steps (c) through (h) whereby a multi layer article is formed.

2. A high-speed process for forming a multi layered article having a plurality of substantially delamination free, pin hole free and void free layers, comprising the following steps:

(a) providing a vacuum chamber containing: i) a movable support, ii) at least one vapor outlet of a flash vaporizer mounted adjacent to an upstream portion of said support, iii) at least one curing means mounted adjacent to a downstream portion of said support, and iv) means for maintaining said support at a temperature below that of said vaporizer;

(b) evacuating gas from said chamber until the pressure within said chamber is less than about $1 \times 10^{-4}$ Torr;

(c) selecting a curable component comprising: i) polyfunctional acrylates, or ii) mixtures of monoacrylates and polyfunctional acrylates, said mixtures having an average of about two or more olefinic groups per molecule, said curable component having: i) an average molecular weight between 150 and 1,000, and ii) a vapor pressure in the range of $1 \times 10^{-6}$ to $1 \times 10^{-1}$ Torr at standard temperature and pressure;

(d) metering a quantity of said curable component into an inlet portion of said vaporizer;

(e) flash vaporizing said component within said vaporizer;

(f) moving said support relative to said vapor outlet and said curing means at a rate of between about 1 cm/sec and 1,000 cm/sec;

(g) condensing a film of vaporized component dispensed from said vapor outlet onto the surface of said support, said film having a thickness of 4 microns or less;

(h) repeating steps (c) through (g) whereby a plurality of films of said component are deposited; and, (i) activating said curing means whereby said films are cured to form a substantially cross linked polymer film on said support.

3. A high-speed process for forming a multi layered article having a plurality of substantially delamination free, pin hole free and void free layers, comprising the following steps:

(a) providing a vacuum chamber containing: i) a movable support, ii) at least one vapor outlet of a flash vaporizer mounted adjacent to an upstream portion of said support, iii) at least one curing means mounted adjacent to a downstream portion of said support, iv) means for maintaining said support at a temperature below that of said vaporizer; and v) means for depositing an inorganic material;

(b) evacuating gas from said chamber until the pressure within said chamber is less than about $1 \times 10^{-4}$ Torr;

(c) selecting a curable component comprising: i) polyfunctional acrylates, or ii) mixtures of monoacrylates and polyfunctional acrylates, said mixtures having an average of about two or more olefinic groups per molecule, said curable component having: i) an average molecular weight between 150 and 1,000, and ii) a vapor pressure in the range of $1 \times 10^{-6}$ to $1 \times 10^{-1}$ Torr at standard temperature and pressure;

(d) metering a quantity of said curable component into an inlet portion of said vaporizer;

(e) flash vaporizing said component within said vaporizer;

(f) moving said support relative to said vapor outlet and said curing means at a rate of between about 1 cm/sec and 1,000 cm/sec;

(g) condensing a film of vaporized component dispensed from said vapor outlet onto the surface of said support, said film having a thickness of 4 microns or less;

(h) activating said curing means whereby a substantially cross linked polymer film is formed on said support;

(i) repeating steps (c) through (h) and, (j) depositing a layer of inorganic material on one or more substantially cured polymer films whereby a multi layered article comprising a plurality of polymer layers and at least one inorganic material layer is formed.

4. A process in accordance with claim 3 wherein a plurality of inorganic material layers are interleaved between said polymer layers.

5. A process in accordance with claims 1, 2 or 3 and further including the placing of a removable substrate on said movable support prior to said vaporizing and curing whereby a plurality of polymer layers are deposited on said substrate.

6. A process in accordance with claim 5 and including the depositing of a release means on said substrate for releasing said article, said release means being deposited prior to said vaporizing step.

7. A process in accordance with claims 1, 2 or 3 and including the depositing of a release means on said movable support prior to said flash vaporizing step for releasing said multi layered article.

8. A process in accordance with claims 1, 2 or 3 and further including providing a plurality of said vapor outlets in said vacuum chamber;

selecting curable components from the group consisting of polyfunctional acrylates and mixtures of monoacrylates and polyfunctional acrylates, said components having an average molecular weight between 150 and 1,000, and a vapor pressure in the range of $1 \times 10^{-6}$ to $1 \times 10^{-1}$ Torr at standard temperature and pressure;

metering a quantity of said curable components into at least two of said vapor outlets;

vaporizing the components;

moving said support relative to said vapor outlets and said curing means at a speed of between about 1 cm/sec. and 1,000 cm/sec.

condensing one or more films of vaporized curable components dispensed from said vapor outlets on to the surface of said support, each film having a thickness of 4 microns or less;

activating said curing means whereby substantially cross linked films are formed on said support.

9. A process in accordance with claim 8 and further including the steps of repeating of said metering, vaporizing, moving said support, condensing and operating said curing means to provide the desired number of films to form said multi layered article.

10. A process in accordance with claim 9 wherein said curable components metered into each of said vapor outlets are the same.

11. A process in accordance with claim 10 wherein said curable components selected from said group are different.

12. A process in accordance with claim 8 and further including the steps of
placing a plurality of said curing means within said chamber, each curing means being located downstream of a vaporizer outlet; and,
activating at least one curing means following the condensing of a film of vaporized component on said support.

13. A process in accordance with claim 12 including the step of sequentially condensing a film of curable component and activating one of said curing means to cross link said condensed component.

14. A process in accordance with claim 1, 2 or 3 and further including the step of removing gases from said curable component prior to said metering.

15. A process in accordance with claim 1, 2 or 3 wherein said support moves continuously.

16. A process in accordance with claim 1, 2 or 3 wherein said support is indexed.

17. A process in accordance with claim 1, 2 or 3 wherein said curable component is a diacrylate.

18. A process in accordance with claim 5 wherein said substrate is flexible.

19. A process in accordance with claims 1, 2 or 3 in which said movable support comprises a rotatable drum.

20. A process in accordance with claims 1, 2 or 3 in which said movable support comprises a disk.

21. A process in accordance with claims 1, 2 or 3 in which said movable support comprises a continuous belt.

22. A process in accordance with claims 1, 2 or 3 in which said curing is by means of electron beam.

23. A process in accordance with claims 1, 2 or 3 and further including the forming of a continuous multi layered strip on said movable support; and,
removing said continuous strip from said movable support.

24. A process in accordance with claim 23 in which said movable support is a rotatable drum.

25. A multi layered article made in accordance with the process of claims 1, 2 or 3.

26. A multi layered article made in accordance with the process of claims 1 or 2 wherein said product comprises at least 1,000 layers.

27. A multi layered article made in accordance with the process of claim 3 wherein said product comprises at least 1,000 layers of cured component.

28. A multi layered article made in accordance with the process of claims 3 or 4 wherein said inorganic material is a metal.

29. A process in accordance with claims 1, 2 or 3 wherein said polyfunctional acrylate has the formula:

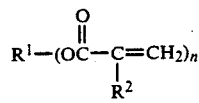

wherein:
$R^1$ is an aliphatic, alicyclic or mixed aliphatic-alicyclic radical derived from a compound of the formula $R^1(OH)_m$;
$R^2$ is a hydrogen, methyl, ethyl, propyl, butyl or pentyl;
n is from 2 to 4;
m is 2 or more.

30. A process in accordance with claims 1, 2 or 3 in which said monoacrylate has the formula:

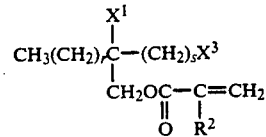

wherein:
$R^2$, r and 2 are defined above;
$x^1$ is H or:

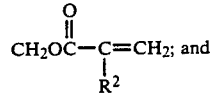

$X^3$ is CN or $COOR^3$ wherein $R^3$ is an alkyl radical containing 1-4 carbon atoms.

31. A process in accordance with claims 1, 2 or 3 wherein said polyfunctional acrylate comprises a diacrylate of the formula:

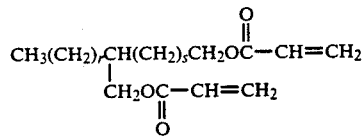

wherein:
r and s are each 7 or 8 and the sum of r and s is 15.

32. A process in accordance with claims 1, 2 or 3 wherein said polyfunctional acrylate is selected from the group consisting of:
(i) 1,6-hexane diol diacrylate;
(ii) alkoxylated cyclohexane dimethanol diacrylates; wherein the alkoxy group contains 1 to 4 carbon atoms and
(iii)

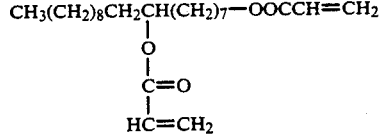

33. A process in accordance with claims 1, 2 or 3 wherein said movable support is maintained at a temperature in the range of about −7° C. to about 80° C.

34. A process in accordance with claims 1, 2 or 3 wherein said movable support comprises a rotating drum and said drum passes said vapor outlet and said curing means at a speed of about 100 cm/sec.

35. A process in accordance with claims 1, 2 or 3 in which said curing means comprises a gas discharge electron beam.

36. A process in accordance with claim 8 in which said vaporizers are flash vaporizers and said components are flash vaporized.

* * * * *